US009591322B2

(12) United States Patent
Wang

(10) Patent No.: US 9,591,322 B2
(45) Date of Patent: Mar. 7, 2017

(54) CODING USING A REDUNDANT DICTIONARY, SUCH AS VIDEO CODING USING A SELF-ADAPTIVE REDUNDANT DICTIONARY INCLUDING SPATIAL AND/OR TEMPORAL PREDICTION CANDIDATE ATOMS

(71) Applicant: Yao Wang, Livingston, NJ (US)

(72) Inventor: Yao Wang, Livingston, NJ (US)

(73) Assignee: New York University, New York, NY (US)

( * ) Notice: Subject to any disclaimer, the term of this patent is extended or adjusted under 35 U.S.C. 154(b) by 235 days.

(21) Appl. No.: 14/586,800

(22) Filed: Dec. 30, 2014

(65) Prior Publication Data

US 2015/0189283 A1   Jul. 2, 2015

Related U.S. Application Data

(60) Provisional application No. 61/921,867, filed on Dec. 30, 2013.

(51) Int. Cl.
*H04N 19/50* (2014.01)
*G06K 9/36* (2006.01)

(52) U.S. Cl.
CPC .................... *H04N 19/50* (2014.11)

(58) Field of Classification Search
CPC .................. H04N 19/50; G06K 9/36
(Continued)

(56) References Cited

U.S. PATENT DOCUMENTS

2003/0058943 A1* 3/2003 Zakhor ............... H04N 19/51
                                                   375/240.12
2007/0019723 A1* 1/2007 Valente ............... H04N 19/97
                                                   375/240.12

(Continued)

OTHER PUBLICATIONS

Karl Skretting and Kjersti Engan, "Image Compression Using Learned Dictionaries by RLS-DLA and Compared with K-SVD," *IEEE International Conference on Acoustics, Speech, and Signal Processing*, pp. 1517-1570 (May 22-27, 2011).

(Continued)

*Primary Examiner* — William C Vaughn, Jr.
*Assistant Examiner* — Jae N Noh
(74) *Attorney, Agent, or Firm* — John C. Pokotylo; Straub & Pokotylo

(57) ABSTRACT

An example video encoder uses a self-adaptive dictionary that only depends on the block location, without requiring real time design/redesign of the dictionary. A mean-removed block may be directly represented using a redundant dictionary including all possible inter-prediction candidates with integer motion vectors (mean-removed). In general the dictionary may also contain some intra-prediction candidates and some pre-designed fixed dictionary atoms. The coefficients may be determined by minimizing the L0 norm of the coefficients subject to a constraint on the sparse approximation error. Using such a self-adaptive dictionary can lead to a very sparse representation, with significantly fewer non-zero coefficients than using the DCT transform on the prediction error. Some example embodiments consistent with the present invention use a modified orthogonal matching pursuit ("OMP") algorithm to orthonormalize each new chosen atom with respect to all previously chosen and orthonormalized atoms. Each image block is represented by the quantized coefficients corresponding to the orthonormalized atoms.

21 Claims, 13 Drawing Sheets

(58) Field of Classification Search
USPC .................................................. 375/240.03
See application file for complete search history.

(56) References Cited

U.S. PATENT DOCUMENTS

2010/0040146 A1* 2/2010 Wang ..................... H04N 19/63
375/240.16
2015/0269441 A1* 9/2015 Mj ..................... G06K 9/00744
382/103

OTHER PUBLICATIONS

Joaquin Zepeda, Christine Guillemot, and Ewa Kijak, "Image Compression Using Sparse Representations and the Iteration-Tuned and Aligned Dictionary," *IEEE Journal of Selected Topics in Signal Processing*, vol. 5, No. 5, pp. 1061-1073 (2011).

Philippe Schmid-Saugeon and Avideh Zakhor, "Dictionary Design for Matching Pursuit and Application to Motion-Compensated Video Coding," *IEEE Trans. on Circuits and Systems for Video Technology*, vol. 14, No. 6, pp. 880-886 (2004).

Je-Won Kang, C-CJ Kuo, Robert Cohen, and Anthony Vetro, "Efficient Dictionary Based Video Coding with Reduced Side Information," *2011 IEEE International Symposium on Circuits and Systems*, pp. 109-112 (2011).

Je-Won Kang, Moncef Gabbouj, and C.-C. Jay Kuo, "Sparse/DCT (S/DCT) Two-Layered Representation of Prediction Residuals for Video Coding," *IEEE Trans. on Image Processing*, vol. 22, No. 7, pp. 2711-2722 (Jul. 2013).

Yipeng Sun, Mai Xu, Xiaoming Tao, and Jianhua Lu, "Online Dictionary Learning Based Intra-Frame Video Coding via Sparse Representation," *2012 15th International Symposium on Wireless Personal Multimedia Communications (WPMC)*, (2012).

Ron Rubinstein, Alfred M. Bruckstein, and Michael Elad, "Dictionaries for Sparse Representation Modeling," *Proceedings of the IEEE*, vol. 98, No. 6, pp. 1045-1057 (Jun. 2010).

T. Tony Cai and Lie Wang, "Orthogonal Matching Pursuit for Sparse Signal Recovery with Noise," *IEEE Trans. on Information Theory*, vol. 57, No. 7, pp. 4680-4688 (Jul. 2011).

Joel A. Tropp, "Greed is Good: Algorithmic Results for Sparse Approximation," *IEEE Trans. on Information Theory*, vol. 50, No. 10, pp. 2231-2242 (Oct. 2004).

Joel A. Tropp and Anna C. Gilbert, "Signal Recovery from Random Measurements via Orthogonal Matching Pursuit," *IEEE Trans. on Information Theory*, vol. 53, No. 12, pp. 4655-4666 (Dec. 2007).

* cited by examiner ately, (A) more coefficients are set to zero, resulting in higher compression but lower decoded image quality, or (B) more non-zero coefficients remain, resulting in higher decoded image quality but lower compression.
CODING USING A REDUNDANT DICTIONARY, SUCH AS VIDEO CODING USING A SELF-ADAPTIVE REDUNDANT DICTIONARY INCLUDING SPATIAL AND/OR TEMPORAL PREDICTION CANDIDATE ATOMS

§1. RELATED APPLICATIONS

This application claims benefit to U.S. Provisional Application Ser. No. 61/921,867, titled "VIDEO CODING USING A SELF-ADAPTIVE REDUNDANT DICTIONARY INCLUDING SPATIAL AND TEMPORAL PREDICTION CANDIDATES," filed on Dec. 30, 2013, and listing Yao WANG as the inventor (referred to as "the '867 provisional" and incorporated herein by reference). The scope of the present invention is not limited to any requirements of the specific embodiments described in '867provisional.

§2. BACKGROUND OF THE INVENTION

§2.1 Field of the Invention

The present invention concerns video coding and decoding. More specifically, the present invention concerns reducing the amount of data needed to code video in compressed form.

§2.2 Background Information

§2.2.1 Conventional Video Encoders and Decoders (Codec's)

Standard video coders are based on the prediction plus transform representation of an image block, which predicts the current block using various intra- and inter-prediction modes and then represents the prediction error using a fixed orthonormal transform. More specifically, FIG. 1 is a block diagram of a conventional encoder 100, such as an encoder that complies with the H.264 standard. The conventional encoder 100 operates on a current video frame 110 and one or more previously coded video frame(s) 125 and outputs a coded bitstream 155. The conventional encoder 100 includes an intra- and/or inter-frame based prediction unit 120, combiners 135 and 170, a transform and quantize unit 145, an entropy encode unit 150. The corresponding decoder includes a entropy decode unit 150 and an inverse transform or inverse quantize (or more specifically, inverse transform and rescale) unit 160.

Still referring to FIG. 1, a current input frame 110 is received for encoding. The frame 110 is processed in units of a macroblock ("MB") 115 (e.g., 16×16 pixels in the original image). Each macroblock is encoded in intra-mode (using information from the current frame 110) or inter-mode (using information from one or more previously coded frame(s) 125. In either case, the intra- and/or inter-frame based prediction unit 120 generates a prediction MB 130. The combiner 135 subtracts the prediction MB 130 from the current MB 115 to generate a residual or difference MB 140. The transform and quantize unit 145 transforms the residual MB 140 (e.g., using a block transform) and quantizes the result to generate a set of quantized transform coefficients. The entropy encode unit 150 entropy encodes these (e.g., re-ordered coefficients). The entropy-encoded coefficients, together with ancillary information required to decode the MB (such as parameters defining the macroblock prediction mode, quantizer step size, motion vector information describing how the macroblock was motion-compensated, etc.) form the coded bitstream 155. The amount of bits in the coded bitstream 155 is much less than that in the current frame 110 that was coded.

Recall that one or more previously coded frame(s) 125 may be used. Such frame(s) 125 may be generated as follows. The inverse transform and inverse quantize (rescale) unit 160 may be used to rescale and inverse transform the coefficients to generate a decoded residual MB 165. Note that the decoded residual MB 165 will not be identical to the original residual MB 140 because information is lost in the quantization process. Combiner 170 adds the prediction MB 130 to the decoded residual MB 165 to generate a reconstructed MB. A filter may be applied to reduce the effects of blocking distortion and a previously coded frame 125 is created from a series of the reconstructed MBs.

Referring back to unit 120, finding a suitable inter-frame prediction is often referred to as "motion estimation". Subtracting an inter-frame prediction from the current macroblock is often referred to as "motion compensation."

Referring back to unit 145, a block of residual samples may be transformed using the 4×4 or 8×8 Discrete Cosine Transform ("DCT") or an integer transform, which approximates DCT. The transform outputs a set of coefficients, each of which is a weighting value for a standard basis pattern. When combined, the weighted basis patterns re-create the block of residual samples. When the transform coefficients are quantized, each coefficient is changed into an integer index that specifies which quantization bin the quantized coefficient belongs to. Quantization reduces the precision of the transform coefficients according to a quantization parameter. Often, the result is a block in which most or all of the coefficients are zero, with a few non-zero coefficients. By tuning the quantization parameter, either (A) more coefficients are set to zero, resulting in higher compression but lower decoded image quality, or (B) more non-zero coefficients remain, resulting in higher decoded image quality but lower compression.

Referring back to unit 150, the video coding process produces a number of values that must be encoded to form the coded bitstream 155. These values may include, for example, (1) the quantized transform coefficient indices, (2) side information to enable the decoder to re-create the prediction, (3) information about the structure of the compressed data and the compression tools used during encoding, and (4) information about the complete video sequence. These values and parameters (also referred to as "syntax elements") may be converted into binary codes using variable length coding and/or arithmetic coding. Each of these encoding methods produces an efficient, compact binary representation of the information. The coded bitstream 155 can then be stored and/or transmitted.

FIG. 2 is a block diagram of a conventional decoder 200, such as a decoder that complies with the H.264 standard. The conventional decoder 200 receives a coded (i.e., compressed) bitstream 255 and outputs a current decoded frame 210. The conventional decoder 200 includes an intra- and/or inter-frame based prediction unit 220, an inverse transform and inverse quantize (or rescale) unit 245, and an entropy decode unit 250. Elements of the coded bitstream 255 are entropy decoded by unit 250 to produce a set of quantized coefficient indices and other side information used for decoding. The inverse transform and inverse quantize (rescale) unit 245 receives the set of quantized coefficient indices, rescales them and inverse transforms them to output a decoded residual MB 240. (The decoded residual MB 240 should be identical to its corresponding decoded residual MB 165 in the encoder 100.) The intra- and/or inter-frame based prediction unit 220 uses side information decoded from the coded bitstream 255 to create a prediction MB 230. (The prediction MB 230 should be identical to the corresponding prediction MB 130 in the encoder 100). The combiner 235 adds the prediction MB to the decoded residual MB 240 to generate a decoded MB 215. The current decoded frame 210 is formed from a series of decoded MBs.

In currently prevalent block-based video coding standards, a single best prediction candidate is chosen among all prediction candidates to predict the current MB, and then the residual (also referred to as the "prediction error") MB is represented with a fixed orthogonal transform (e.g. the Discrete Cosine Transform ("DCT")).

§2.2.1.1 Using Dictionaries for Block-Based Image and Video Coding

In the following, as understood by those having ordinary skill in the art of information theory, "atoms" are elementary signals which can be used to decompose a signal. A "dictionary" is a set of atoms used to decompose a signal. A dictionary is said to be "orthonormal" if all atoms have norm one and are orthogonal to each other. With such a dictionary, representation coefficients of a signal can be computed as inner products of the signal and the atoms of the dictionary. An orthonormal dictionary is also called an orthonormal transform, and for a signal with dimension N, it will have N atoms. An "overcomplete" dictionary is one having more atoms than the dimensions of the signal.

Recent progress in the field of sparse representation has shown that signal representation using a redundant dictionary can be more efficient than using an orthonormal transform, because the redundant dictionary can be designed so that a typical signal can be approximated well by a sparse set of dictionary atoms. (See, e.g., the article, M. Aharon, M. Elad, and A. Bruckstein, "K-SVD: An Algorithm for Designing Overcomplete Dictionaries for Sparse Representation," *IEEE Trans. on Signal Processing*, vol. 54, no. 11, pp. 4311-4322 (2006), incorporated herein by reference.)

Several research groups have attempted using redundant dictionaries for block-based image and video coding. (See, e.g., the article, Karl Skretting and Kjersti Engan, "Image Compression Using Learned Dictionaries by RLS-DLA and Compared with K-SVD," *IEEE International Conference on Acoustics, Speech, and Signal Processing*, (2011) (incorporated herein by reference), the article, Joaquin Zepeda, Christine Guillemot, and Ewa Kijak, "Image Compression Using Sparse Representations and the Iteration Tuned and Aligned Dictionary," *IEEE Journal of Selected Topics in Signal Processing*, vol. 5, no. 5, pp. 1061-1073 (2011) (incorporated herein by reference), the article, Philippe Schmid-Saugeon and Avideh Zakhor, "Dictionary Design for Matching Pursuit and Application to Motion Compensated Video Coding," *IEEE Trans. on Circuits and Systems for Video Technology*, vol. 14, no. 6, pp. 880-886 (2004) (incorporated herein by reference), the article, Je-Won Kang, C-CJ Kuo, Robert Cohen, and Anthony Vetro, "Efficient Dictionary Based Video Coding with Reduced Side Information," *Circuits and Systems (ISCAS)*, 2011 IEEE International Symposium on. IEEE, 2011, pp. 109-112 (incorporated herein by reference), and the article, Je-Won Kang, Moncef Gabbouj, and C.-C. Jay Kuo, "Sparse/DCT (S/DCT) Two-Layered Representation Of Prediction Residuals for Video Coding," *IEEE Trans. on Image Processing*, vol. 22, no. 7, pp. 2711-2722 (July 2013) (incorporated herein by reference).) In these reported dictionary-based video coders, the dictionary atoms are used to represent the motion-compensation error block (that is, the residual MB) for inter-frame video coding.

Instead of using a single dictionary, the article, Je-Won Kang, C-CJ Kuo, Robert Cohen, and Anthony Vetro, "Efficient Dictionary Based Video Coding with Reduced Side Information," *Circuits and Systems (ISCAS)*, 2011 IEEE International Symposium on. IEEE, 2011, pp. 109-112 (incorporated herein by reference.) uses multiple dictionaries, pre-designed for different residual energy levels. The work in the article, Je-Won Kang, Moncef Gabbouj, and C.-C. Jay Kuo, "Sparse/DCT (S/DCT) Two-Layered Representation Of Prediction Residuals for Video Coding," *IEEE Trans. on Image Processing*, vol. 22, no. 7, pp. 2711-2722 (July 2013) (incorporated herein by reference) proposes a two-layered transform coding framework, which finds a sparse representation using orthogonal matching pursuit ("OMP") with an overcomplete dictionary learned offline using the K-Singular Value Decomposition ("K-SVD") algorithm and codes the resultant approximation error with the fixed DCT transform. The work in the article, Yipeng Sun, Mai Xu, Xiaoming Tao, and Jianhua Lu, "Online Dictionary Learning Based Intra-Frame Video Coding Via Sparse Representation," *Wireless Personal Multimedia Communications (WPMC)*, 2012 15th International Symposium on, (2012) (incorporated herein by reference) codes each frame in the intra-frame mode, with a dictionary that is updated in real time based on the previously coded frames. Although such online adaptation can yield a dictionary that matches with the video content very well, it is very demanding computationally.

It would be useful to provide better video decoding and/or decoding techniques.

§3. SUMMARY OF THE INVENTION

Example embodiments consistent with the present invention use a self-adaptive dictionary that only depends on the block location, without requiring real time design/redesign of the dictionary.

Example embodiments consistent with the present invention directly represent a mean-removed block using a redundant dictionary including all possible inter-prediction candidates with integer motion vectors (mean-removed). In general the dictionary may also contain some intra-prediction candidates and some pre-designed fixed dictionary atoms. The coefficients may be determined by minimizing the L0 norm of the coefficients subject to a constraint on the sparse approximation error. Using such a self-adaptive dictionary can lead to a very sparse representation, with significantly fewer non-zero coefficients than using the DCT transform on the prediction error.

Some example embodiments consistent with the present invention use a modified orthogonal matching pursuit ("OMP") algorithm to orthonormalize each new chosen atom with respect to all previously chosen and orthonormalized atoms. Each image block is represented by the quantized coefficients corresponding to the orthonormalized atoms. This avoids inefficiencies associated with using non-orthonormal atoms. Each image block may be represented by its mean, which is predictively coded, the indices of the chosen atoms, and the quantized coefficients. Each variable may be coded based on its unconditional distribution, or conditional distribution.

The inventor has found that simulations show that the proposed coder can achieve significant gain over the H.264 coder (implemented using x264) and achieve similar performance compared with the HEVC reference encoder (HM). It is also possible to use the self-adaptive dictionary to derive the first approximation of a block to be coded, and then apply a fixed pre-designed dictionary or a fixed orthonormal transform to the difference between the original block and the first approximation.

§4. BRIEF DESCRIPTION OF THE DRAWINGS

§5. DETAILED DESCRIPTION

Figure 1:
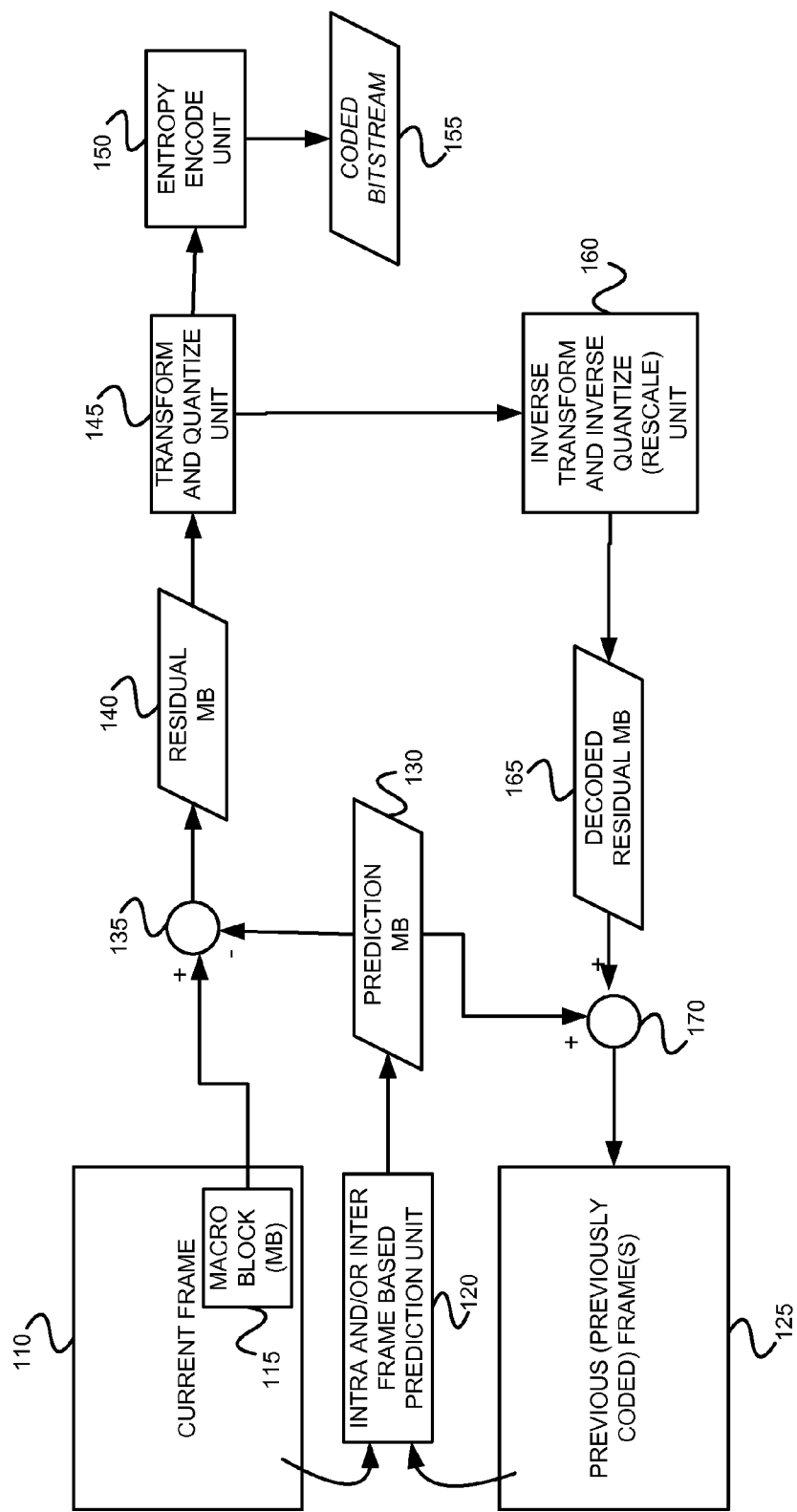
FIG. 1 is a block diagram of a conventional video encoder.
Figure 2:
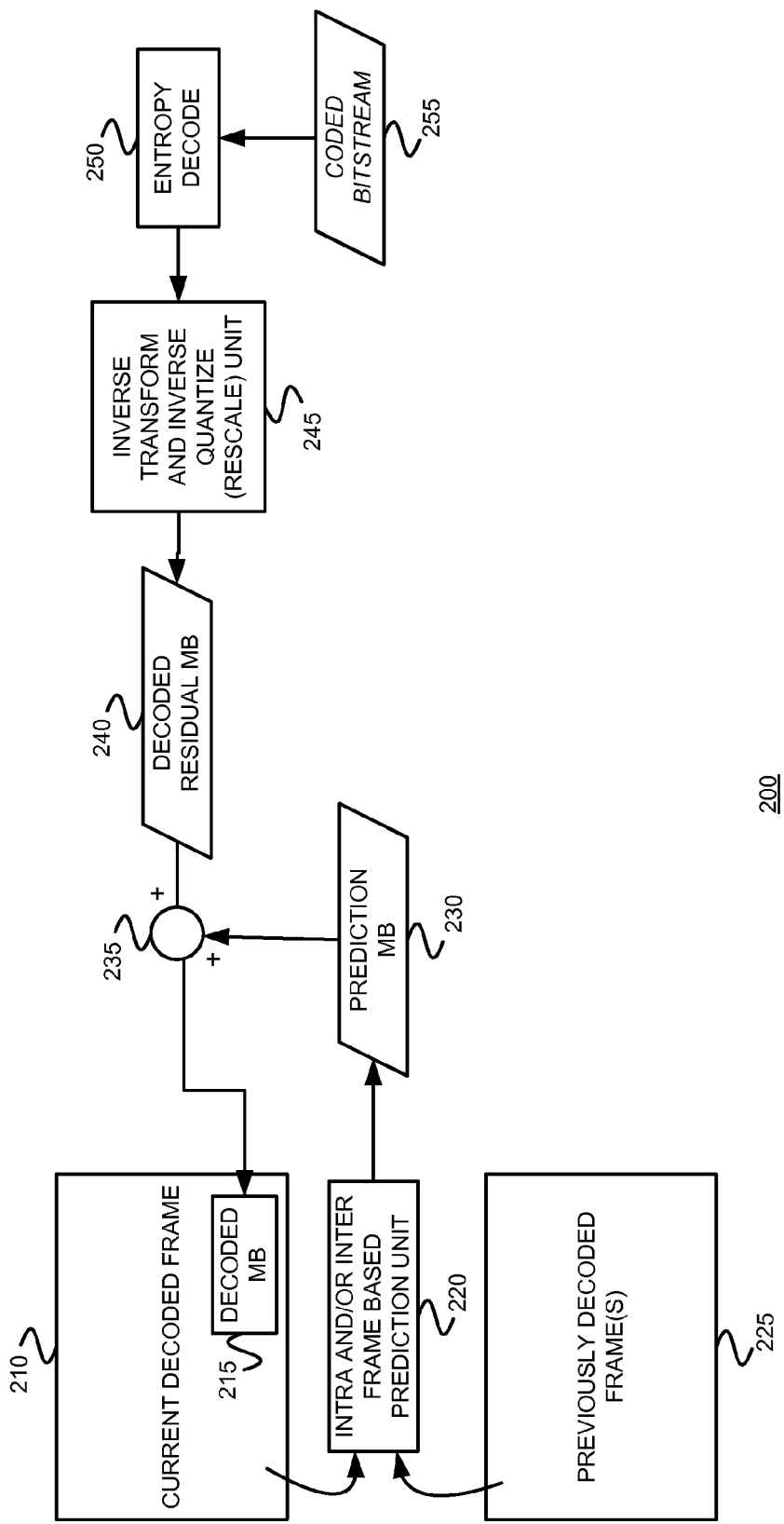
FIG. 2 is a block diagram of a conventional video decoder.

Example embodiments consistent with the present invention may involve novel methods, apparatus, message formats, and/or data structures for using a self-adaptive redundant dictionary including spatial and temporal prediction candidates. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown, and the inventor regards her invention as any patentable subject matter described.

In the following, an overview providing context for specific example embodiments consistent with the present invention is provided in §5.1. Then, example methods and apparatus for encoding video in a manner consistent with the present invention are described in §5.2. Thereafter, example methods and apparatus for decoding video in a manner consistent with the present invention are described in §5.3. Some refinements, alternatives and extensions to the described embodiments are described in §5.4. Finally, some conclusions are presented in §5.5.

§5.1 OVERVIEW

As noted in §2.2.1.1 above, recent progress in sparse representation has shown that signal representation using a redundant dictionary can be more efficient than using an orthonormal transform, because the redundant dictionary can be designed so that a typical signal can be approximated well by a sparse set of dictionary atoms.

Instead of using a fixed, learned dictionary based on training image blocks, example embodiments consistent with the present invention represent each image block in a video frame using a self-adaptive dictionary which may includes all possible spatial and temporal prediction candidate blocks following a preset prediction rule. For example, the dictionary may include all inter-frame prediction candidates, which are shifted blocks of the same size in the previous frame within a defined search range, and all possible intra-frame prediction candidates, which are obtained with various intra-prediction modes in the H.264/HEVC encoder. The present inventor chose to use such prediction candidates as the dictionary atoms because the current block is likely to be very similar to a few of these candidates, and therefore only a few candidates may be needed to represent the current block accurately. To handle the possibility that some blocks cannot be represented efficiently by the prediction candidates, some example embodiments consistent with the present invention also incorporate some pre-designed fixed dictionary atoms in the redundant dictionary. Basically, these fixed atoms are used to describe the residual prediction error by the chosen prediction candidates, and also serve to mitigate the accumulation of reconstruction errors in previously decoded frames. In some example embodiments consistent with the present invention, the DCT basis vectors are for the fixed part of the dictionary, given that current video coders all use DCT (or DCT-like) basis to specify the prediction error.

As described in §5.2.1 below, in some example embodiments consistent with the present invention, the sparse set of the dictionary atoms and their associated coefficients are determined by minimizing the L0 norm of the coefficients subject to a constraint on the approximation error.

Simulations supervised by the inventor have demonstrated that using the proposed self-adaptive dictionary can lead to a very sparse representation, with significantly fewer non-zero coefficients, than using the DCT on the error between the original block and the best prediction candidate.

Unlike the previous proposals in which dictionary atoms are used to represent the motion-compensation error block for intra/inter-frame video coding, example embodiments consistent with the present invention represent the original block directly using selected atoms from a self-adaptive dictionary. Once the best sparse set of the atoms are chosen to represent the block, the chosen atoms are further converted to a set of orthonormal atoms. The coefficients corresponding to these orthonormal atoms will be much less correlated and can be quantized and coded independently without losing coding efficiency.

§5.2 ENCODING

§5.2.1 Example Encoder

Figure 3:
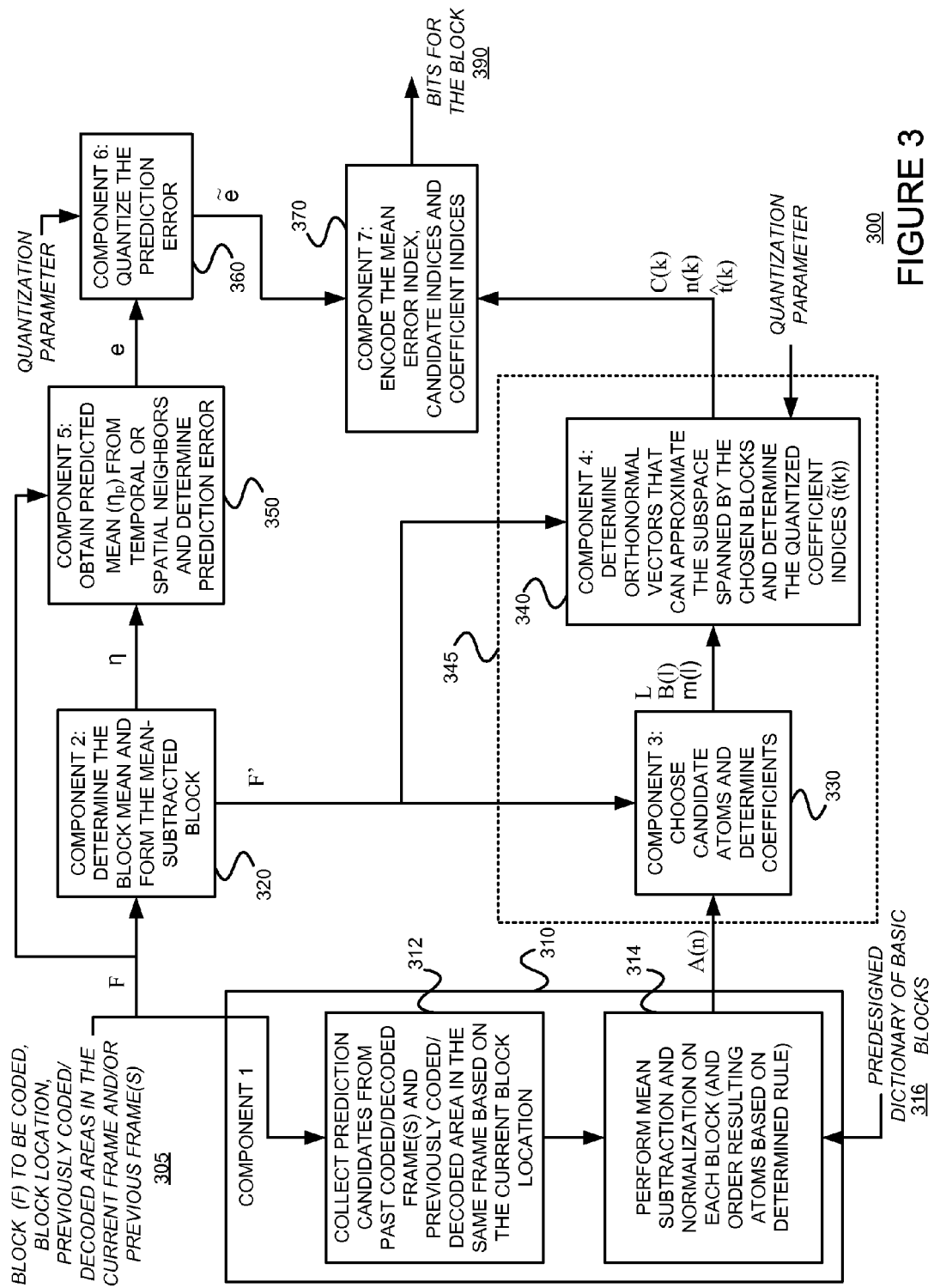
FIG. 3 is a block diagram of a video encoder consistent with the present invention.

The proposed coding framework encodes a video frame block by block. FIG. 3 shows the block diagram of an example encoder 300, consistent with the present invention, for coding one block. Assume that the encoder 300 saves the previously coded/decoded frame and the previously coded/decoded blocks of the current frame, 305 which are needed to generate the inter-prediction and intra-prediction candidates. In the following, "F" is used to denote the vector representation of the block, and "M" is used to denote the number of pixels in each block (which is the dimension of F). Note that each component in FIG. 3 refers to a functional modules or units of the overall encoding process. The components can be implemented in hardware and/or software. The functions of some components can be combined.

Component 1 310 of the example encoder 300 forms the redundant dictionary for representing block F. In the following, "N" denotes the total number of atoms, and "A(n)" (wherein n=1, 2, ..., N) denotes the $n^{th}$ dictionary atom. As described below, the redundant dictionary includes both (1) a self-adaptive part and (2) a predesigned (fixed) part. The self-adaptive part of this redundant dictionary comes from neighboring blocks in the previously coded/decoded frame(s) and/or the neighboring blocks in previously coded/decoded area before the current block in the same frame. For example, this part of the redundant dictionary can include all the inter-prediction candidates corresponding to different integer motion vectors, and all the intra-prediction candidates corresponding to different intra-prediction modes of the H.264 encoder (See, e.g., the article, Wiegand, Thomas, Gary J. Sullivan, Gisle Bjontegaard, and Ajay Luthra. "Overview of the H.264/AVC Video Coding Standard," *IEEE Transactions on Circuits and Systems for Video Technology*, Vol. 13, No. 7, pp. 560-576 (2003), incorporated herein by reference.), or the HEVC encoder (See, e.g., the article, Han, G. J., Jens-Rainer Ohm, Woo-Jin Han, and Thomas Wiegand, "Overview of the High Efficiency Video Coding (HEVC) Standard." *IEEE Transactions on Circuits and Systems for Video Technology*, Vol. 22, No. 12, pp. 1649-1668 (2012), incorporated herein by reference.) Each prediction candidate block provided from 312 further goes through mean subtraction and normalization 314, so that each resulting atom A(n) has zero mean and norm one. The resulting part of the redundant dictionary is referred to as the self-adaptive part because it depends on the location of the block to be coded, and the actual video content. The pre-designed (fixed) part of the redundant dictionary 316 should contain atoms that can be linearly combined to well represent the residual prediction error after using the atoms in the first part. The optimal design of this fixed dictionary 316 can be determined by one having ordinary skill in the art. For example, one possible design of the predesigned (fixed) part of the redundant dictionary is to use a learned dictionary from training image blocks, where the training blocks are the prediction error blocks when only the best inter-prediction candidate is used to predict the original block. Alternatively, one can also use elements from a fixed orthonormal basis, e.g. all basis vectors of the 2D Discrete Cosine Transform ("DCT"), except the one that is all constant, to provide the fixed part 316 of the redundant dictionary. Given the training image blocks, one can use the K-SVD algorithm to derive the fixed part 316 of the redundant dictionary. (See, e.g., the article, Aharon, Michal, Michael Elad, and Alfred Bruckstein. "K-SVD: An Algorithm For Designing Overcomplete Dictionaries for Sparse Representation," *IEEE Transactions on Signal Processing*, Vol. 54, No. 11, pp. 4311-4322 (2006), incorporated herein by reference.) All the atoms of the dictionary including both the self-adaptive part and the pre-designed fixed part are generated and ordered based on a preset rule, so that the decoder can form the same set of atoms and give them the same indices.

Component 2 320 of the example encoder 300 determines the mean value ($\eta$) of the block (F), and generates the mean-subtracted block (F'=F−$\eta$).

Component 3 330 of the example encoder 300 chooses a subset of atoms in the dictionary, which can be linearly combined to represent the mean-subtracted block (F') with a small error, while minimizing a cost function that measures the sparsity of the coefficients (w(n)). For example, one feasible cost function is the L1 norm of w(n). Mathematically, this can be described as to find the weighting coefficients w(n), where n=1, 2, ..., N, by solving the following optimization problem:

$$\text{Find } w(n) \text{ to minimize } \sum_n |w(n)| \qquad (1)$$

$$\text{subject to: } \frac{1}{M} \left\| F' - \sum_n w(n)A(n) \right\|^2 \le \epsilon_1^2$$

The foregoing optimization problem can be solved by several published methods such as, for example, the least angle regression ("LAR") method. (See, e.g., the article, B. Efron, T. Hastie, I. Johnstone, and R. Tibshirani. "Least Angle Regression," *Annals of Statistics*, Vol. 32, No. 2, pp. 407-499 (2004), incorporated herein by reference.) One can also minimize the L0 norm, which minimizes the number of coefficients that are non-zero. However, minimizing the L0 norm is mathematically a more challenging problem.

Once w(n) are determined, only those atoms with coefficients larger than a threshold ($\epsilon$) in magnitude are chosen. (In one example embodiment, the chosen atoms are ordered in the decreasing order of coefficient magnitude |w(n)|, though this is not necessary.) The indices of the chosen atoms are denoted by m(l), l=1, 2, ..., L, wherein L is the number of chosen atoms. The chosen atoms can be denoted by B(l). The chosen atoms B(l) are a subset of the initial set of atoms of the redundant dictionary (that is, A(m(l))).

Component 4 340 of the example encoder 300 determines (1) K orthonormal vectors (denoted as C(k), and also referred to as "orthonormal atoms") that can approximate the subspace defined by the chosen atoms B(l), l=1, 2, ..., L, well, and (2) the quantized coefficients $\hat{t}(k)$, k=1, 2, ..., K, associated with C(k). The quantized values are further specified by quantization indices $\tilde{t}(k)$. The original mean-subtracted block is approximated by $\hat{F}=\sum_{k=1}^{K} \hat{t}(k) C(k)$. Note that, due to quantization, it is possible that less than L orthogonal vectors will have non-zero coefficients. Also note that the indices for the chosen atoms may be changed. Therefore, generally, K (K≤L in general) is used to denote the number of remaining atoms (which equals the number of orthonormal vectors), and n(k) is used to denote the indices of remaining atoms. Note that this method for orthonormalizing the chosen dictionary atoms and performing quantization and coding in the orthonormalized subspace represented by the chosen atoms is applicable to any dictionary-based coding method, and is not limited to the example encoder 300.

Component 5 350 of the example encoder 300 obtains a predicted block mean ($\eta_p$) from spatial and/or temporal neighbors, and forms the mean prediction error ($e=\eta-\eta_p$). For example, $\eta_p$ may be the mean value of the previously coded block in the same frame. Alternatively, $\eta_p$ may be the mean value of the block in the previously coded frame corresponding to the first chosen atom.

Component 6 360 of the example encoder 300 quantizes the mean prediction error to (ê) with quantization index ê. For example, a uniform quantizer with the same quantization step size as that for coefficient t(k) may be used. Alternatively, a different type of quantizer, or a different step size may be used.

Component 7 370 of the example encoder 300 applies entropy coding on the quantized mean prediction error index ê from component 6 360, and chosen candidate indices n(k), k=1, 2, . . . , K, and quantized coefficient indices t̂(k), k=1, 2, . . . , K from component 4 340 to generate a binary bit stream 390 for this block (F). There are many possibly ways of performing such entropy coding. For example, each variable can be coded separately using Huffman coding or arithmetic coding based on each variable's probability distribution (which can be collected during a training stage). Alternatively, the context based binary arithmetic coding ("CABAC") method used in H.264 or HEVC for coding the non-zero transform coefficient locations can be used to code the sequence of n(k) for all k, and the CABAC method for coding the non-zero transform coefficient values can be used to code the sequence of t̂(k), for all k.

§5.2.2 Sparse Representation Using OMP with Embedded Orthonormalization

Referring back to components 3 330 and 4 340 of FIG. 3 above, an example encoder can first determine a sparse set of atoms and their corresponding coefficients by solving a sparse decomposition problem (Recall Component 3 330.), and then orthonormalize the chosen atoms (Recall Component 4 440.). However, in an alternative example encoder consistent with the present invention, as indicated by block 345 in FIG. 3, when using the orthogonal matching pursuit ("OMP") algorithm to solve the sparse decomposition problem, the orthonormalization step is embedded within the OMP iteration. In this alternative example embodiment, the orthonormal vectors (C(k), where k=1, 2, . . . , K) are found through a modified OMP process. In such an alternative embodiment, the encoder directly determines which atoms are chosen and the quantized coefficients corresponding to the orthonormal vectors. The decoder can perform the same orthonormalization process on the chosen atoms to derive the orthonormal vectors that were used at the encoder.

To derive the sparse representation for F' using A(n) with coefficients w(n), we solve the following constrained optimization problem:

$$\text{Find } w(n) \text{ to minimize } \sum_n \|w(n)\|_0 \quad (2)$$

$$\text{subject to: } \frac{1}{M}\left\|F' - \sum_n w(n)A(n)\right\|^2 \leq \epsilon_1^2$$

Where $\|w(n)\|_0$ is 1 if w(n) is non-zero, and is 0 if w(n) is zero (or with a magnitude less than a threshold ($\epsilon$). Note that this is the L2-bounded noise variant of the classical "L0 sparse recovery" problem. (See, e.g., the article, T. Tony Cai and Lie Wang, "Orthogonal Matching Pursuit for Sparse Signal Recovery with Noise," *IEEE Trans. on Information Theory*, vol. 57, no. 7, pp. 4680-4688 (July 2011), incorporated herein by reference.). The OMP process may be used to solve the problem, and is advantageous because of its fast convergence and the flexibility to embed orthonormalization. (See, e.g., the article, Joel A. Tropp, "Greed Is Good: Algorithmic Results for Sparse Approximation," *IEEE Trans. on Information Theory*, vol. 50, no. 10, pp. 2231-2242 (October 2004) (incorporated herein by reference), and the article, Joel A. Tropp and Anna C. Gilbert, "Signal Recovery from Random Measurements Via Orthogonal Matching Pursuit," *IEEE Trans. on Information Theory*, vol. 53, no. 12, pp. 4655-4666 (December 2007) (incorporated herein by reference.). The original OMP algorithm can be used directly in Component 3 of FIG. 3, to determine the chosen atoms m(l) and the corresponding atoms B(l).

In the original OMP algorithm, a least square step is used in each iteration to update all the coefficients up to the newly chosen atom, and the coefficients are related to the original chosen atoms. (See, e.g., the article, Joel A. Tropp and Anna C. Gilbert, "Signal Recovery from Random Measurements Via Orthogonal Matching Pursuit," *IEEE Trans. on Information Theory*, vol. 53, no. 12, pp. 4655-4666 (December 2007).) On the other hand, in an example embodiment consistent with the present invention, the orthonormalization procedure is embedded inside the OMP algorithm. That is, after a new atom B(k)=A(n(k)) (where n(k) is the index of the $k^{th}$ chosen atom) is selected, it will be orthonormalized with respect to all previous orthonormalized atoms. The coefficient corresponding to the new orthonormalized atom C(k) is then simply determined by the inner product of F' with C(k). At each iteration, the residual (r) is updated using the orthonormalized atoms and their corresponding coefficients. The modified OMP is described with the following pseudo code:

---
Input: Dictionary atoms A(n), n=1,2,...,N, mean-subtracted block F',
threshold value $\epsilon_1$
Result: The number of chosen atoms K, Sparse coefficients t(k),
k=1,2,...,K, and chosen atom indices n(k), k = 1, 2, . . . , K
initialization: residual r ← F'; k=0;
while $\| r \|_2 > \epsilon_1$ do
    k ← k+1;
    choose among the remaining atoms that is most correlated with
    r: n(k) ← argmax$_n$ |< A(n),r >|; B(k)=A(n(k));
    C(k) ← orthonormalize B(k) with respect to previously chosen and
    orthonormalized atoms C(i),i=1,2,...,k−1;
    t(k) ← <F', C(k)>;
    update r ← r − t(k)C(k);
end

---

To orthonormalize a given atom B(k)=A(n(k)) with respect to a set of previously determined orthonormalized atoms C(i), i=1, . . . , k−1, the well-known Gram-Schmidt orthogonalization algorithm can be applied, using:

$$C' = B(k) - \sum_{i=1}^{k-1} < B(k), C(i) > C(i), \quad C(k) = \frac{C'}{\|C'\|_2} \quad (3)$$

Once all the orthonormal atoms and their corresponding coefficients are found, uniform quantization may then be applied to each coefficient t(k) with the same step size q. The quantized value is denoted by t̂(k). Note that it is also possible to embed quantization within the OMP iterations. That is, it is possible to quantize t(k) and use the quantized version t̂(k) to compute the residual r at each iteration of the modified OMP.

The modified OMP process described above generates K orthonormalized vectors C(k), and the quantized coefficients $\hat{t}(k)$ with quantization indices $\tilde{t}(k)$, k=1, 2, ..., K. Note that C(k) are equivalent to the orthonormal vectors obtained from the set of original candidates A(n(k)), k=1, 2, ..., K using the original Gram-Schmidt a/gorithm.

The final reconstruction error is the sum of the sparse representation error plus the quantization error for the coefficients, assuming the two types of error are independent. Therefore, the error $\epsilon_1$ should be proportionally smaller than the target final reconstruction error. In one example embodiment, for a chosen quantization step size q, the sparse approximation error $\epsilon_1$ is set to be slightly larger than the expected quantization error. That is $$\epsilon_1^2 > \frac{q^2}{12}.$$

§5.2.3 Entropy Coding for Chosen Atom Indices and Quantized Coefficients

For each block, the quantized mean value of the block is coded. Then, the indices of the chosen atoms in the same order used for producing the final orthonormal vectors are coded. Finally, the quantized coefficients corresponding to the orthonormalized vectors are coded.

For the block mean, predictive coding may be performed. In one embodiment consistent with the present invention, the mean value of the current block is predicted from the co-located block in the previous frame and the prediction error is quantized. The probability distribution of the quantized mean prediction error from training images is collected. An entropy coder can be designed using this distribution. A special symbol EOB is included among the possible symbols to indicate the case that the quantized prediction error is zero and no other non-zero coefficients are needed. This would be the case when a block can be presented by a constant block with the predicted mean value accurately up to the target coding distortion.

To specify which atoms are chosen, all atoms may be arranged in a pre-defined order, and the indices of the chosen atoms may be coded successively. More specifically, all possible inter-prediction candidates may be placed into a 2-D array, based on their displacement vectors, with respect to the current block position. They may then be converted to a 1-D array, using a 1-D clockwise spiral path starting from the center. For example, the first (n=1), second (n=2) and the third (n=3) candidates in the spiral path are those candidates with displacements (0, 0), (−1, 0), and (0, 1), respectively. All the atoms in the fixed part of the dictionary may be attached at the end, following the well-known zigzag order. In one example implementation, intra-prediction candidate atoms are not used because the inventor determined experimentally that these candidate atoms are seldom chosen. To code the indices of the chosen atoms, experiments indicate that there is very little correlation between positions of chosen candidates for the same block or across adjacent blocks. However, the probability distribution of the index of the first chosen atom is quite different from that of the second chosen atom, which is different from that of the third chosen atom, and so on. The first few chosen atoms are more likely to be the prediction candidates associated with small motion vectors, whereas the remaining atoms are more randomly distributed. Based on this observation, the index of the $k^{th}$ chosen atom may be coded using its own probability distribution. The inventor has determined experimentally, that the distributions of coefficients for k>10 are similar, and therefore can be coded using the same distribution. A special symbol EOB in addition to all possible atom indices is included to indicate the case that no more atoms are chosen.

The quantized coefficient values may also be coded sequentially, with the $k^{th}$ coefficient coded using the probability distribution of the $k^{th}$ coefficient's quantization index. This strategy is motivated by the inventor's observation that the distributions of the first few coefficients are somewhat different. However, since the distributions of coefficients for k>10 are very similar, the coefficients for k>10 may be coded using the same distribution.

Although the foregoing example scheme does not exploit the redundancy in the possible patterns of successive coefficient indices and values, using an arithmetic coding scheme to take advantage of such redundancy (similar to the CABAC method used in H.264 and HEVC (See, e.g., the article, D. Marpe, H. Schwarz, and T. Wiegand, "Context-Based Adaptive Binary Arithmetic Coding in the H.264/Avc Video Compression Standard," *IEEE Trans. on Circuits and Systems for Video Technology*, vol. 13, no. 7, pp. 620-636 (July 2003), incorporated herein by reference.) will likely improve the coding efficiency.

§5.2.4 Example Methods Used in Encoding

Figure 4:
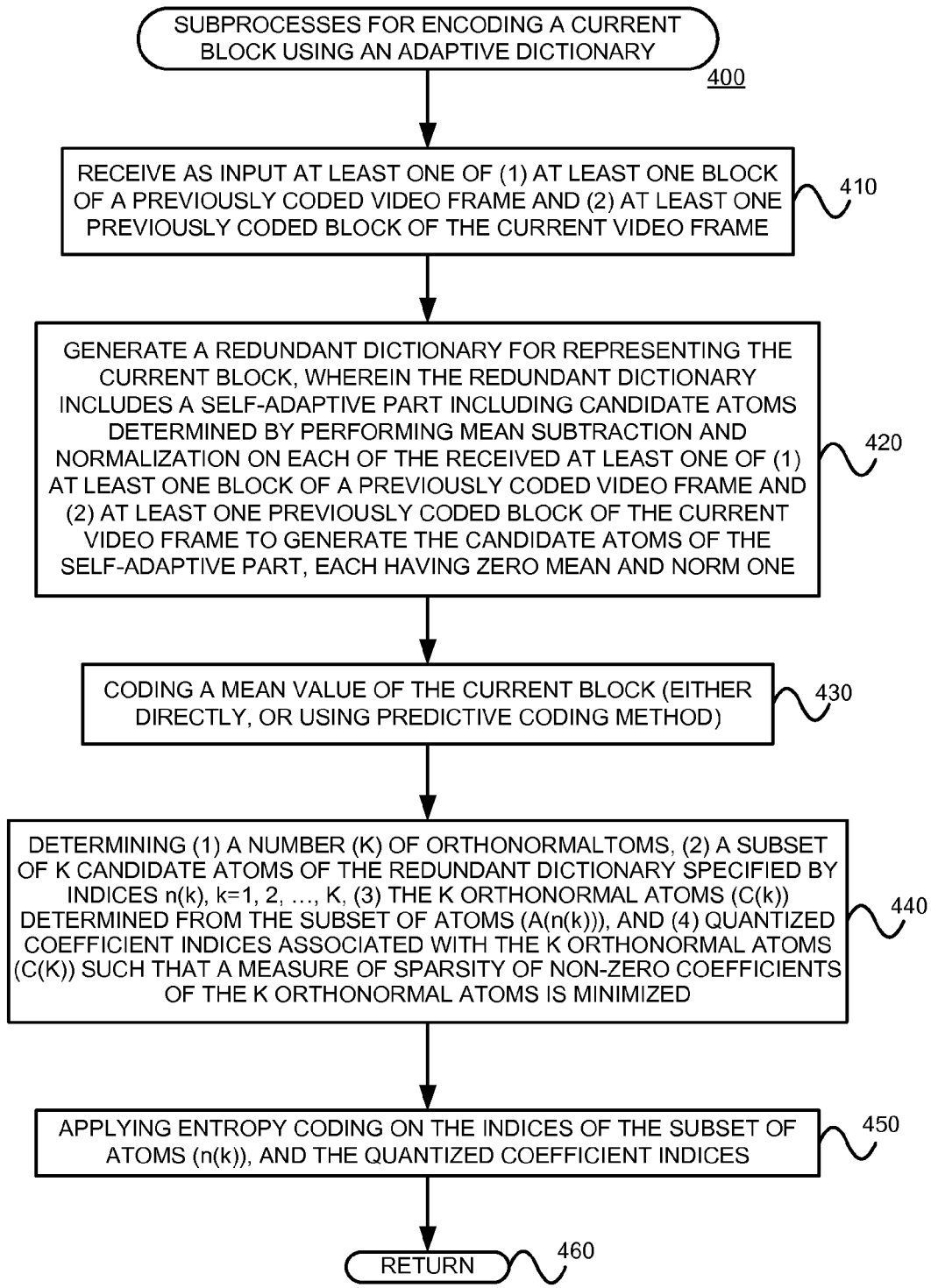
FIG. 4 is a flow diagram of an example method, consistent with the present invention, for performing sub-processes for encoding of a current block using an adaptive dictionary.

FIG. 4 is a flow diagram of an example method 400, consistent with the present invention, for performing subprocesses for encoding of a current block (F) using an adaptive dictionary. The example method 400 includes receiving as input at least one of (1) at least one block of a previously coded video frame and (2) at least one previously coded block of the current video frame. (Block 410. Recall, e.g., 305 of FIG. 3.) Next, the example method 400 generates a redundant dictionary for representing the current block, wherein the redundant dictionary includes a self-adaptive part including candidate atoms determined by performing mean subtraction and normalization on each of the received at least one of (1) at least one block of a previously coded video frame and (2) at least one previously coded block of the current video frame to generate the candidate atoms of the self-adaptive part, each having zero mean and norm one. (Block 420. Recall 310 of FIG. 3.) Also, a mean value (ii) of the current block (F) is coded, either directly, or using predictive coding method. (Block 430. Recall 320 of FIG. 3.) The example method 400 also determines (1) a number (K) of orthonormalized atoms, (2) a subset of K candidate atoms of the redundant dictionary specified by indices n(k), k=1, 2, ..., K, (3) the K orthonormal atoms (C(k)) determined from the subset of atoms (A(n(k))), and (4) quantized coefficient indices ($\tilde{t}(k)$) associated with the K orthonormal atoms (C(k)), such that a measure of sparsity of non-zero coefficients (t(k)) of the K orthonormal atoms is minimized. (Block 440. Recall 330 and 340, or 345 of FIG. 3.) Finally, entropy coding is applied on the indices of the subset of atoms (n(k)), and the quantized coefficient indices ($\tilde{t}(k)$). (Block 450. Recall 370 of FIG. 3.)

In some example embodiments consistent with example method 400, the self-adaptive part of the redundant dictionary includes at least one of (A) all inter-prediction candidates corresponding to different integer motion vectors, and (B) all the intra-prediction candidates corresponding to different intra-prediction modes of an H.264 compliant encoder, or an HEVC compliant encoder.

In some example embodiments consistent with example method 400, the redundant dictionary further includes a predesigned part including candidate atoms that can be linearly combined to represent a residual prediction error after using the candidate atoms of the self-adaptive part. In some example embodiments consistent with example method 400, the candidate atoms of the predesigned part of the redundant dictionary are atoms of a learned dictionary, trained by the prediction error blocks when only the self-adaptive part of the dictionary is used to predict the original block. In some example embodiments consistent with example method 400, the candidate atoms of the predesigned part of the redundant dictionary are derived from the K-Singular-Value-Decomposition ("K-SVD") algorithm. In some example embodiments consistent with example method 400, the candidate atoms of the predesigned part of the redundant dictionary are from a fixed orthonormal basis, except the one that is all constant.

In some example embodiments consistent with example method 400, the received at least one of (1) at least one block of a previously coded video frame is at least one block that was extracted from a previously coded frame in a defined search range surrounding the current block and (2) at least one previously coded block of the current video frame is at least one block that was extracted from a defined search range in a previously coded area of the current frame.

In some example embodiments consistent with example method 400, a binary bit stream for the block (F) is generated by encoding each variable separately using one of (A) Huffman coding or (B) arithmetic coding based on a probability distribution of each variable.

In some example embodiments consistent with example method 400, a binary bit stream for the block (F) is generated using context based binary arithmetic coding ("CABAC") to encode any non-zero transform coefficient locations of the sequence of n(k) for all k, and using CABAC to encoding the non-zero transform coefficient values of the sequence of $\hat{t}$(k), for all k.

Figure 5:
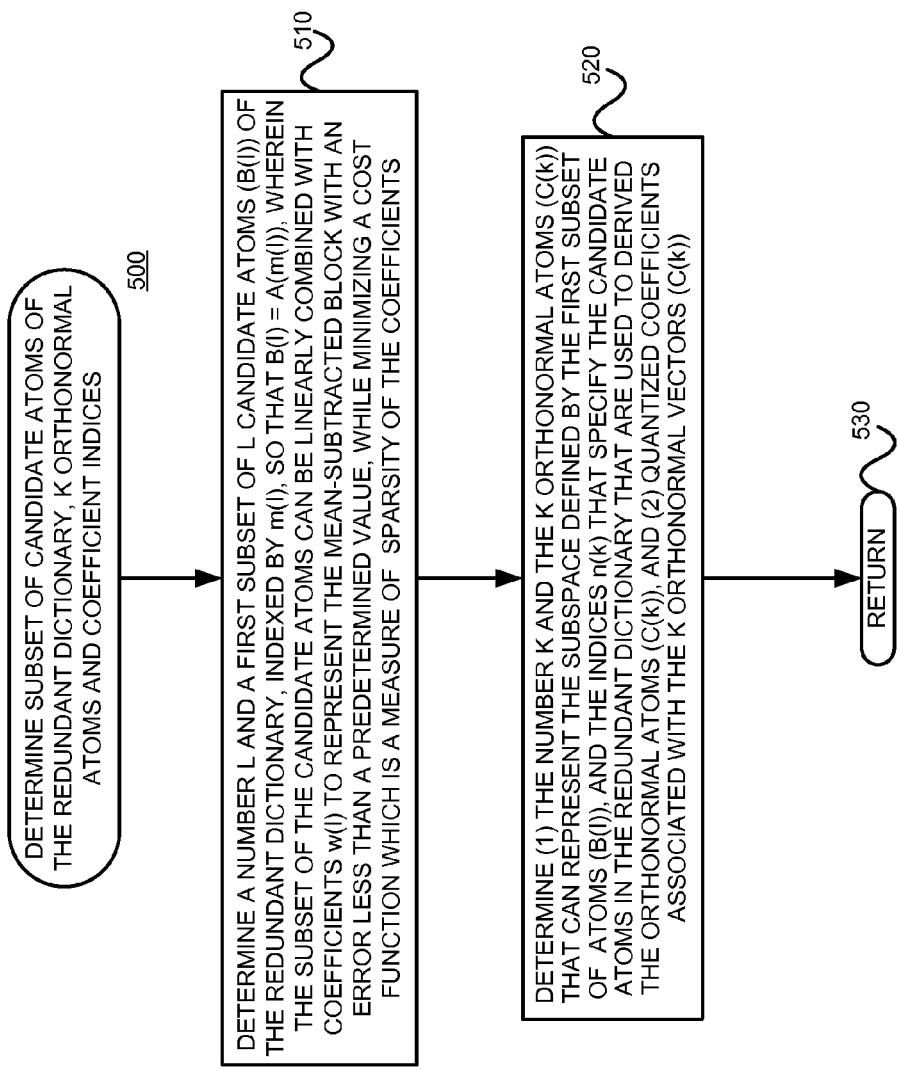
FIG. 5 is a flow diagram of an example method, consistent with the present invention, for determining a subset of candidate atoms of a redundant dictionary, orthonormal atoms, and coefficient indices.

Referring back to 440 of FIG. 4 (and blocks 330 and 340 of FIG. 3), FIG. 5 is a flow diagram of a first example method 500, consistent with the present invention, for determining a subset of candidate atoms of a redundant dictionary, orthonormal atoms, and coefficient indices. Although not shown in FIG. 5, a mean-subtracted block (F') is generated using the current block and the mean value of the current block (F'=F−η). (Recall 320 of FIG. 3.) The first example method 500 then determines a number L and a first subset of L candidate atoms (B(l)) of the redundant dictionary, indexed by m(l), so that B(l)=A(m(l)), wherein the subset of the candidate atoms can be linearly combined with coefficients w(l) to represent the mean-subtracted block (F') with an error less than a predetermined value, while minimizing a cost function which is a measure of sparsity of the coefficients. (Block 510. Recall 330 of FIG. 3.) The first example method 500 then determines (1) the number K and the K orthonormal atoms (C(k)) that can represent the subspace defined by the first subset of atoms (B(l)), and the indices n(k) that specify the candidate atoms in the redundant dictionary that are used to derived the orthonormal atoms (C(k)), and (2) quantized coefficient indices ($\hat{t}$(k)) associated with the K orthonormal vectors (C(k)). (Block 520. Recall 340 of FIG. 3.)

Referring back to block 510 of FIG. 5, in some example embodiments consistent with the present invention, the cost function is an L1 norm of w(n) and finds coefficients w(n), where n=1, 2, . . . , N, by solving the following optimization problem:

$$\text{Find } w(n) \text{ to minimize } \sum_n |w(n)| \quad (4)$$

subject to: $\frac{1}{M} \left\| F' - \sum_n w(n)A(n) \right\|^2 \leq \epsilon_1^2$ In other example embodiments consistent with the present invention, the cost function is an L0 norm of w(n) and finds coefficients w(n), where n=1, 2, . . . , N, by solving the following optimization problem:

$$\text{Find } w(n) \text{ to minimize } \sum_n |w(n)|_0 \quad (5)$$

subject to: $\frac{1}{M} \left\| F' - \sum_n w(n)A(n) \right\|^2 \leq \epsilon_1^2$ Referring back to block 520 of FIG. 5, in some example embodiments consistent with the present invention, the act of determining (1) the number K and the K orthonormal atoms (C(k)) that can represent the subspace defined by the first subset of atoms (B(l)), and the indices n(k) that specify the candidate atoms in the redundant dictionary that are used to derived the orthonormal atoms (C(k)), and (2) quantized coefficients ($\hat{t}$(k)) associated with the K orthonormal vectors (C(k)), includes: performing recursive orthonormalization on the first subset of candidate atoms B(l) and quantization on coefficients of the orthonormal atoms C(k); and deriving the K orthonormal atoms (C(k)) from the first subset of atoms (B(l)) using a Gram-Schmidt orthonormalization procedure on the first subset of atoms (B(l)).

In at least some example embodiments of the example method 500, the first subset of candidate atoms includes only those candidate atoms with coefficients larger than a threshold ($\epsilon_2$) in magnitude.

Figure 6:
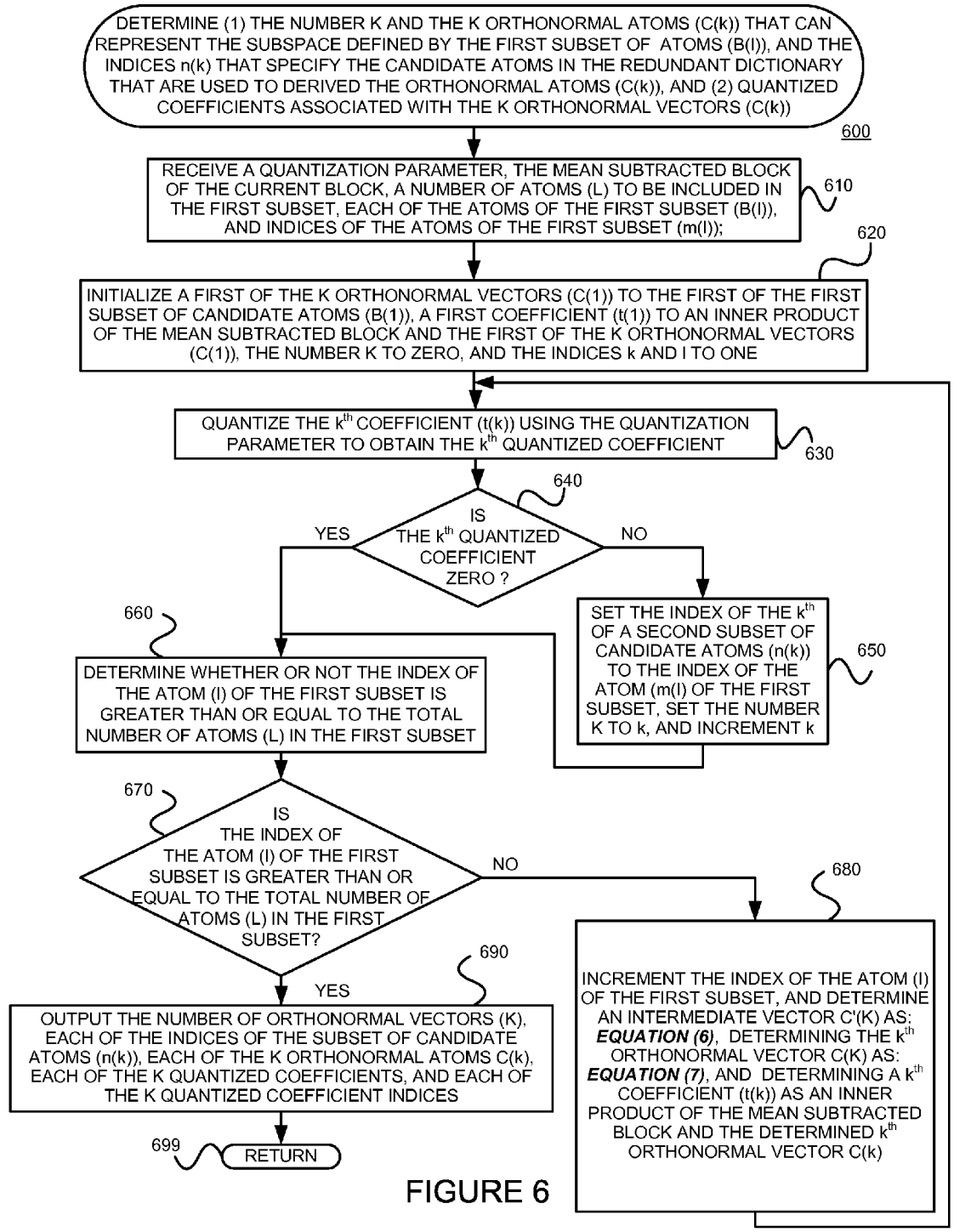
FIG. 6 is a flow diagram of an example method, consistent with the present invention, for determining various values used by an encoder.

FIG. 6 is a flow diagram of an example method 600, consistent with the present invention, for determining (1) K orthonormal vectors (C(k)) that can approximate the subspace defined by the first subset of atoms (B(l)), and (2) the quantized coefficients ($\hat{t}$(k)) associated with the K orthonormal vectors (C(k)). As shown, the example method 600 receives a quantization parameter, the mean subtracted block (F') of the current block, a number of atoms (L) to be included in the first subset, each of the atoms of the first subset (B(l)), and indices of the atoms of the first subset (m(l)). (Block 610) The example method 660 initializes: a first of the K orthonormal vectors (C(1)) to the first of the first subset of candidate atoms (B(1)); a first coefficient (t(1)) to an inner product of the mean subtracted block (F') and the first of the K orthonormal vectors (C(1)); the number K to zero; and the indices k and l to one. (Block 620) The example method 600 then quantizes the $k^{th}$ coefficient (t(k)) using the quantization parameter to obtain the $k^{th}$ quantized coefficient $\hat{t}$(k). (Block 630) The example method 600 then determines whether or not the $k^{th}$ quantized coefficient $\hat{t}$(k) is zero. (Decision 640) Responsive to a determination that the $k^{th}$ quantized coefficient $\hat{t}$(k) is not zero (Decision 640, NO), the example method 660 sets the index of the $k^{th}$ of a second subset of candidate atoms (n(k)) to the index of the atom (m(l)) of the first subset, sets the number K to k, and increments k. (Block 650) Continuing from 650, or responsive to a determination that the $k^{th}$ quantized coefficient $\hat{t}$(k) is zero (Decision 640, YES), the example method 600 determines whether or not the index of the atom (l) of the first subset is greater than or equal to the total number of atoms (L) in the first subset. (Block 660) Then, responsive to a determination that the index of the atom (l) of the first subset is greater than or equal to the total number of atoms (L) in the first subset (Decision 670, YES), the example method 600 outputs the number of orthonormal vectors (K), each of the indices of the subset of candidate atoms (n(k)), each of the K orthonormal atoms C(k), each of the K quantized coefficients (t̂(k)), and each of the K quantized coefficient indices (t̃(k)) (Block 690) before the example method 600 is left (Node 699). Otherwise, responsive to a determination that the index of the atom (l) of the first subset is not greater than or equal to the total number of atoms (L) in the first subset (Decision 670, NO), the example method 600 increments the index of the atom (l) of the first subset, and determines an intermediate vector C'(k) as:

$$C'(k)=B(l)-\Sigma_{i=1}^{k-1}(B(l)C(i))C(i), \quad (6)$$

where (B(l), C(i)) denotes an inner product of two vectors B(l) and C(i), determines the $k^{th}$ orthonormal vector C(k) as:

$$C(k)=C'(k)/\|C'(k)\|, \text{ where } \|C'(k)\| \text{ denotes an } L2 \text{ norm of } C'(k), \quad (7)$$

and determines a $k^{th}$ coefficient (t(k)) as an inner product of the mean subtracted block (F') and the determined $k^{th}$ orthonormal vector C(k) (Block 680), and continues back to 630.

In some example embodiments of the example method 600, before the act of initializing, the atoms (m(l)) of the subset are ordered based on the coefficients w(m(l)) associated with their corresponding atoms.

Referring back to 630 of FIG. 6, in some example embodiments of the example method 600, the act of quantizing the $k^{th}$ coefficient (t(k)) using the quantization parameter to obtain the $k^{th}$ quantized coefficient t̂(k) uses a uniform quantizer for each coefficient with the same quantization step size. In other example embodiments of the example method 600, the act of quantizing the $k^{th}$ coefficient (t(k)) using the quantization parameter to obtain the $k^{th}$ quantized coefficient t̂(k) uses a quantizer with a deadzone.

Thus, as shown in FIG. 6, in one example embodiment consistent with the present invention, C(k) and t̃(k) are obtained by performing recursive orthonormalization (Recall block 680) and coefficient quantization (Recall block 630), and deriving C(k) from the original B(l). This example process uses a Gram-Schmidt-like orthogonalization procedure on the set of originally chosen atoms B(l), but with vectors that have quantized coefficients of zero thrown away. In the example method 600, (B, C) denotes the inner product of two vectors B and C, and ∥C∥ denotes the L2 norm of C, with $\|C\|=(C,C)^{1/2}$. This example method 600 generates K orthonormalized vectors C(k), chosen atom indices n(k) and quantized coefficients t̂(k) with quantization indices t̃(k). C(k) are equivalent to the orthonormalized vectors obtained from the original candidates A(n(k)), k=1, 2, . . . , K using the original Gram-Schmidt algorithm. (See, e.g., the article, Leon, S. J., Bjrck, and Gander, W. (2013), "Gram-Schmidt Orthogonalization: 100 Years and More," *Numerical Linear Algebra with Applications*, Vol. 20, No. 3, pp. 492-532 (2013), incorporated herein by reference.) Therefore, upon receiving the indices n(k), the decoder can deduce C(k).

Referring to FIG. 6, as indicated by the branch from block 680 back to block 630, the example method 600 can be iterated several times. At the end of each iteration, the chosen atoms (which is smaller than the original set if K<L) are reordered based on the coefficients associated with their corresponding orthogonal vectors. Then the same method 600 is applied to this reordered new set of atoms. The iteration of the method 600 may continue until a stop condition (e.g., no more zero coefficients are identified in the last pass) is reached. As noted above, in the example method 600, a uniform quantizer for each coefficient with the same quantization step size may be used to quantize t(k). Alternatively, a quantizer with a deadzone, as in H264 and HEVC, may be used to quantize t(k).

Recall from §5.2.2 above that OMP with embedded orthonormalization may be used to determine a subset of candidate atoms of a redundant dictionary, orthonormal atoms, and coefficient indices. That is, referring back to 440 of FIGS. 4 and 345 of FIG. 3, in some example embodiments consistent with the present invention, the act of determining (1) a number (K) of orthonormal atoms, (2) a subset of K candidate atoms of the redundant dictionary specified by the indices n(k), k=1, 2, . . . , K, (3) the K orthonormal atoms (C(k)) determined from the subset of atoms (A(n(k))), and (4) quantized coefficient indices (t̃(k)) associated with the K orthonormal atoms (C(k)), such that a measure of sparsity of non-zero coefficients (t(k)) of the K orthonormalized atoms is minimized, uses a revised orthogonal matching pursuit ("OMP") process with embedded orthonormalization.

FIGS. 7-10 are flow diagrams of different example methods, consistent with the present invention, for determining a subset of candidate atoms of a redundant dictionary, orthonormal atoms, and coefficient indices. Each of these example methods is described below. Note that in each of the example methods, although not shown, a mean-subtracted block (F') is generated using the current block and the mean value of the current block (F'=F−η). (Recall 320 of FIG. 3.) Note also that the threshold $\epsilon_1$ in FIGS. 7-10 is not the same as $\epsilon_1$ in Equations (1), (2), (4) and (5) (though they are related by a factor of $\sqrt{M}$).

Figure 7:
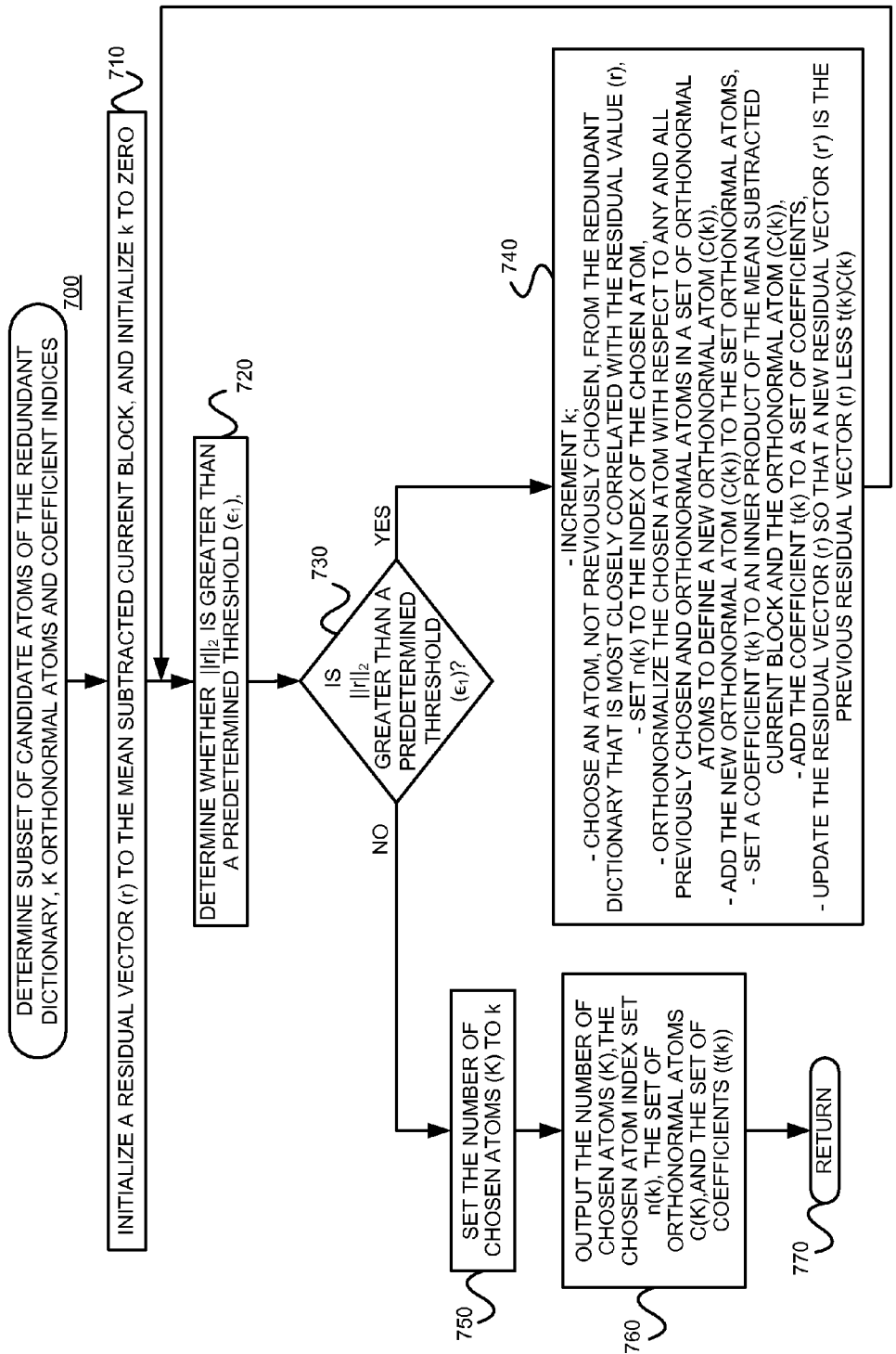
FIGS. 7-10 are flow diagrams of different example methods, consistent with the present invention, for determining a subset of candidate atoms of a redundant dictionary, orthonormal atoms, and coefficient indices.

Referring to FIG. 7, example method 700 initializes a residual vector (r) to the mean subtracted current block, and initializes k to zero. (Block 710) The example method 700 then determines whether $\|r\|_2$ is greater than a predetermined threshold ($\epsilon_1$). (Block 720) Responsive to a determination that $\|r\|_2$ is greater than the predetermined threshold ($\epsilon_1$) (Decision 730, YES), the example method 700: increments k; chooses an atom, not previously chosen, from the redundant dictionary that is most closely correlated (that is, largest inner product magnitude) with the residual value (r); orthonormalizes the chosen atom with respect to any and all previously chosen and orthonormal atoms in a set of orthonormal atoms to define a new orthonormal atom (C(k)); adds the new orthonormal atom (C(k)) to the set orthonormal atoms; sets a coefficient t(k) to an inner product of the mean subtracted current block and the orthonormal atom (C(k)); adds the coefficient t(k) to a set of coefficients; updating the residual vector (r) so that a new residual vector (r') is the previous residual vector (r) less t(k)C(k) (Block 740), and then branches back to 720. Otherwise, responsive to a determination that $\|r\|_2$ is not greater than the predetermined threshold ($\epsilon_1$) (Decision 730, NO), the example method 700 sets the number of chosen atoms (K) to k (Block 750), and outputs the number of chosen atoms (K), the chosen atom index set n(k), the set of orthonormal atoms C(k), and the set of coefficients (t(k)) (Block 760), before it 700 is left (Node 770).

Figure 8:
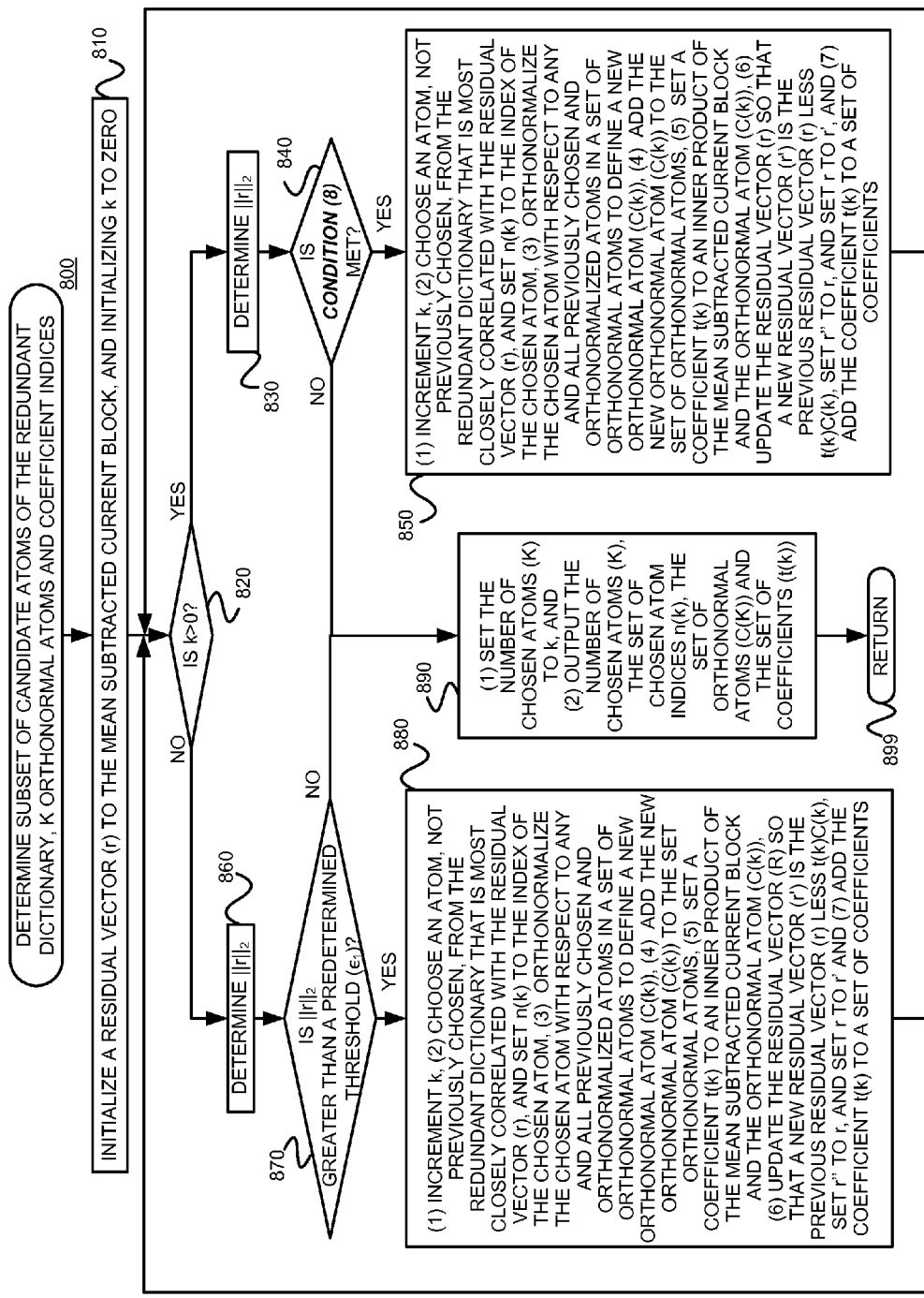

The example method 800 of FIG. 8 is a variant of the method 700 that includes an early termination condition. Referring to FIG. 8, the example method 800 initializes a residual vector (r) to the mean subtracted current block, and initializes k to zero. (Block 810) It is determined whether or not k>0. (Decision 820) Responsive to a determination that k>0 (Condition 820, YES), the example method 800 determines $\|r\|_2$, and responsive to a determination that:

$\|r\|_2$ is greater than a predetermined threshold ($\epsilon_1$)
and the error reduction ratio defined as $(\|r''\|_2-\|r\|_2)/\|r''\|_2$ is greater than a predetermined
threshold ($\epsilon_2$) (8), (Condition 840, YES), the example method 800: increments k; chooses an atom, not previously chosen, from the redundant dictionary that is most closely correlated with the residual vector (r), and sets n(k) to the index of the chosen atom; orthonormalizes the chosen atom with respect to any and all previously chosen and orthonormal atoms in a set of orthonormal atoms to define a new orthonormal atom (C(k)); adds the new orthonormal atom (C(k)) to the set of orthonormal atoms; sets a coefficient t(k) to an inner product of the mean subtracted current block and the orthonormal atom (C(k)); updates the residual vector (r) so that a new residual vector (r') is the previous residual vector (r) less t(k)C(k), set r'' to r, and set r to r'; and adds the coefficient t(k) to a set of coefficients (Block 850) before branching back to 820. Otherwise, responsive to a determination that:

$\|r\|_2$ is not greater than the predetermined threshold
($\epsilon_1$), or the error reduction ratio defined as
$(\|r''\|_2-\|r\|_2)/\|r''\|_2$ is not greater than a predetermined threshold ($\epsilon_2$) (8'), the example method 800 sets the number of chosen atoms (K) to k, and outputs the number of chosen atoms (K), the set of chosen atom indices n(k), the set of orthonormal atoms (C(k)) and the set of coefficients (t(k)) (Block 890) before it 800 is left (Node 899). Referring back to condition 820, responsive to a determination that k is not greater than 0 (e.g., that k=0), the example method 800 determines $\|r\|_2$. (Block 860) Responsive to a determination that $\|r\|_2$ is greater than a predetermined threshold ($\epsilon_1$) (Condition 870, YES), the example method 800: increments k; chooses an atom, not previously chosen, from the redundant dictionary that is most closely correlated with the residual vector (r), and sets n(k) to the index of the chosen atom; orthonormalizes the chosen atom with respect to any and all previously chosen and orthonormal atoms in a set of orthonormal atoms to define a new orthonormal atom (C(k)); adds the new orthonormal atom (C(k)) to the set orthonormal atoms; sets a coefficient t(k) to an inner product of the mean subtracted current block and the orthonormal atom (C(k)); updates the residual vector (r) so that a new residual vector (r') is the previous residual vector (r) less t(k)C(k), set r'' to r, and set r to r; adds the coefficient t(1) to a set of coefficients (Block 880) before branching back to 820. Referring back to condition 870, responsive to a determination that $\|r\|_2$ is not greater than a predetermined threshold ($\epsilon_1$), the example method 800 progresses to block 890, already described above.

Note that since blocks 830 and 860 are identical, they can be combined and moved before condition 820, provided that processing following blocks 850 and 880 would proceed to such a combined step. Also note that since blocks 850 and 880 are identical, they can be combined.

Figure 9:
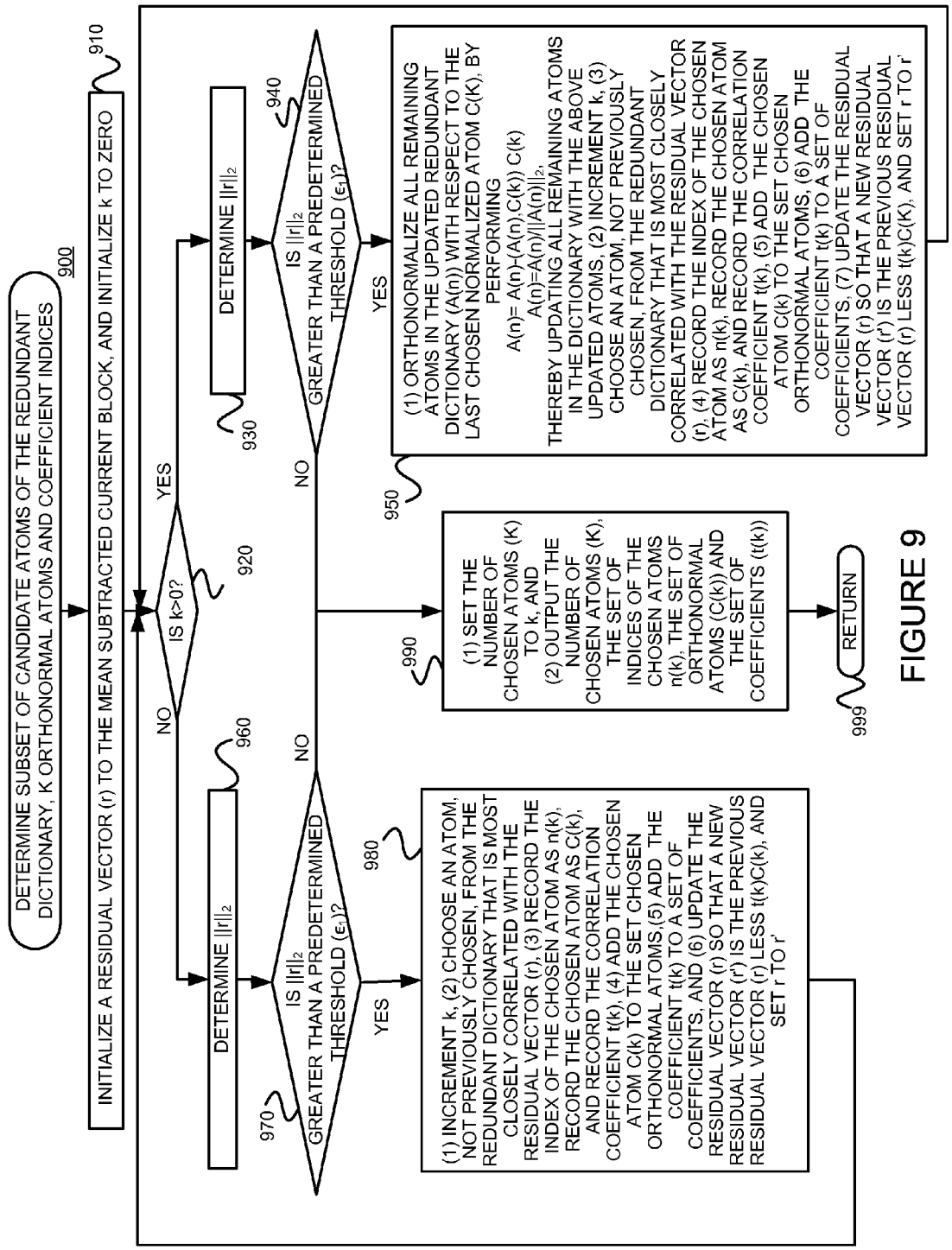

The example method 900 of FIG. 9 is a variant of the method 700. Referring to FIG. 9, the example method 900 initializes a residual vector (r) to the mean subtracted current block, and initializes k to zero. (Block 910) It is determined whether or not k>0. (Decision 920) Responsive to a determination that k>0 (Condition 920, YES), the example method 900 determines VII 2. (Block 930) Responsive to a determination that $\|r\|_2$ is greater than a predetermined threshold ($\epsilon_1$) (Condition 940, YES), the example method 900: orthonormalizes all remaining atoms in the updated redundant dictionary (A(n)) with respect to the last chosen normalized atom C(k), by performing:

$A(n)=A(n)-(A(n),C(k))C(k)$ $A(n)=A(n)/\|A(n)\|_2$ (9)

thereby updating all remaining atoms in the dictionary with the above updated atoms; increments k; chooses an atom, not previously chosen, from the redundant dictionary that is most closely correlated with the residual vector (r); records the index of the chosen atom as n(k), records the chosen atom as C(k), and recording the correlation coefficient t(k); adds the chosen atom C(k) to the set chosen orthonormal atoms; adds the coefficient t(k) to a set of coefficients; updates the residual vector (r) so that a new residual vector (r') is the previous residual vector (r) less t(k)C(k); and sets r to r' (Block 950) before branching back to condition 920. Referring back to condition 940, responsive to a determination that $\|r\|_2$ is not greater than a predetermined threshold ($\epsilon_1$) (Condition 940, NO), the example method 900: sets the number of chosen atoms (K) to k; and outputs the number of chosen atoms (K), the set of indices of the chosen atoms n(k), the set of orthonormal atoms (C(k)) and the set of coefficients (t(k)) (Block 990) before it 900 is left (Node 999). Referring back to condition 920, responsive to a determination that k is not greater than 0 (e.g., that k=0) (Condition 920, NO), the example method determines $\|r\|_2$. (Block 960) Then, responsive to a determination that $\|r\|_2$ is greater than a predetermined threshold ($\epsilon_1$) (Condition 970, YES), the example method 900: increments k; chooses an atom, not previously chosen, from the redundant dictionary that is most closely correlated with the residual vector (r); records the index of the chosen atom as n(k), records the chosen atom as C(k), and records the correlation coefficient t(k); adds the chosen atom C(k) to the set chosen orthonormal atoms; adds the coefficient t(k) to a set of coefficients, and updates the residual vector (r) so that a new residual vector (r') is the previous residual vector (r) less t(k)C(k), and sets r to r' (Block 980) before branching back to 920. Referring back to 970, responsive to a determination that $\|r\|_2$ is not greater than a predetermined threshold ($\epsilon_1$) (Condition 970, NO), the example method 900 proceeds to 990, already described above.

Note that since blocks 930 and 960 are identical, they can be combined and moved before condition 920, provided that processing following blocks 950 and 980 would proceed to such a combined step.

Figure 10:
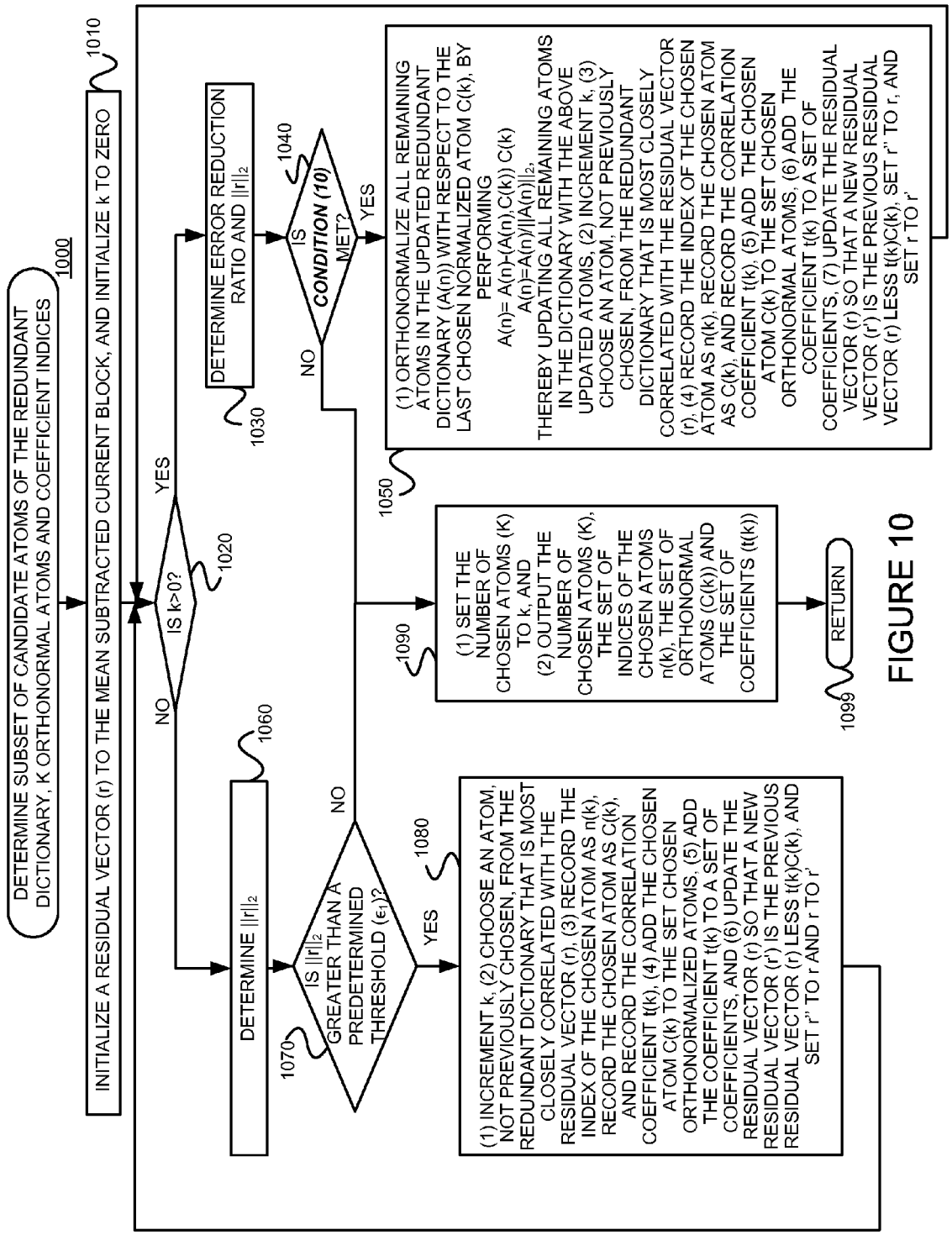

The example method 1000 of FIG. 10 is a variant of the method 900 that includes an early termination condition. Referring to FIG. 10, the example method 1000 initializes a residual vector (r) to the mean subtracted current block, and initializes k to zero. (Block 1010) It is determined whether or not k>0. (Decision 1020) Responsive to a determination that k>0 (Condition 1020, YES), the example method 1000 determines $\|r\|_2$ and an error reduction ratio defined as $(\|r''\|_2-\|r\|_2)/\|r''\|_2$. (Block 1030). Then, responsive to a determination that:

both $\|r\|_2$ is greater than the predetermined threshold
($\epsilon_1$) and the error reduction ratio is greater than
the predetermined threshold ($\epsilon_2$) (10)

(Condition 1040, YES), the example method 1000: orthonormalizes all remaining atoms in the updated redundant dictionary (A(n)) with respect to the last chosen normalized atom C(k), by performing:

$$A(n)=A(n)-(A(n),C(k))C(k)$$

$$A(n)=A(n)/\|A(n)\|_2 \qquad (9)$$

thereby updating all remaining atoms in the dictionary with the updated atoms; increments k; chooses an atom, not previously chosen, from the redundant dictionary that is most closely correlated with the residual vector (r); records the index of the chosen atom as n(k), the chosen atom as C(k), and the correlation coefficient t(k); adds the chosen atom C(k) to the set chosen orthonormal atoms; adds the coefficient t(k) to a set of coefficients; and updates the residual vector (r) so that a new residual vector (r') is the previous residual vector (r) less t(k)C(k), set r" to r, and r to r' (Block 1050) before branching back to 1020. Referring back to condition 1040, responsive to a determination that:

$$\text{either } \|r\|_2 \text{ is not greater than the predetermined threshold } (\epsilon_1), \text{ or the error reduction ratio is greater than the predetermined threshold } (\epsilon_2) \qquad (10')$$

the example method 1000: sets the number of chosen atoms (K) to k; and outputs the number of chosen atoms (K), the set of orthonormal atoms (C(k)), the indices (n(k)), and the set of coefficients (t(k)) (Block 1090) before it 1000 is left (Node 1099). Referring back to condition 1020, responsive to a determination that k is not greater than zero (e.g., k=0) (Condition 1020, NO), the example method 1000 determines $\|r\|_2$. (Block 1060) Then, responsive to a determination that $\|r\|_2$ is greater than a predetermined threshold ($\epsilon_1$) (Condition 1070, YES), the example method 1000: increments k; chooses an atom, not previously chosen, from the redundant dictionary that is most closely correlated with the residual vector (r); records the index of the chosen atom as n(k), the chosen atom as C(k), and the correlation coefficient t(k); adds the chosen atom C(k) to the set chosen orthonormal atoms; adds the coefficient t(k) to a set of coefficients; and updates the residual vector (r) so that a new residual vector (r') is the previous residual vector (r) less t(k)C(k), sets r" to r, and r to r' (Block 1080) before branching back to condition 1020. Referring back to condition 1070, responsive to a determination that that $\|r\|_2$ is not greater than a predetermined threshold ($\epsilon_1$) (Condition 1070, NO), the example method 1000 proceeds to block 1090, already described above.

§5.3 DECODING

§5.3.1 Example Decoder

Figure 11:
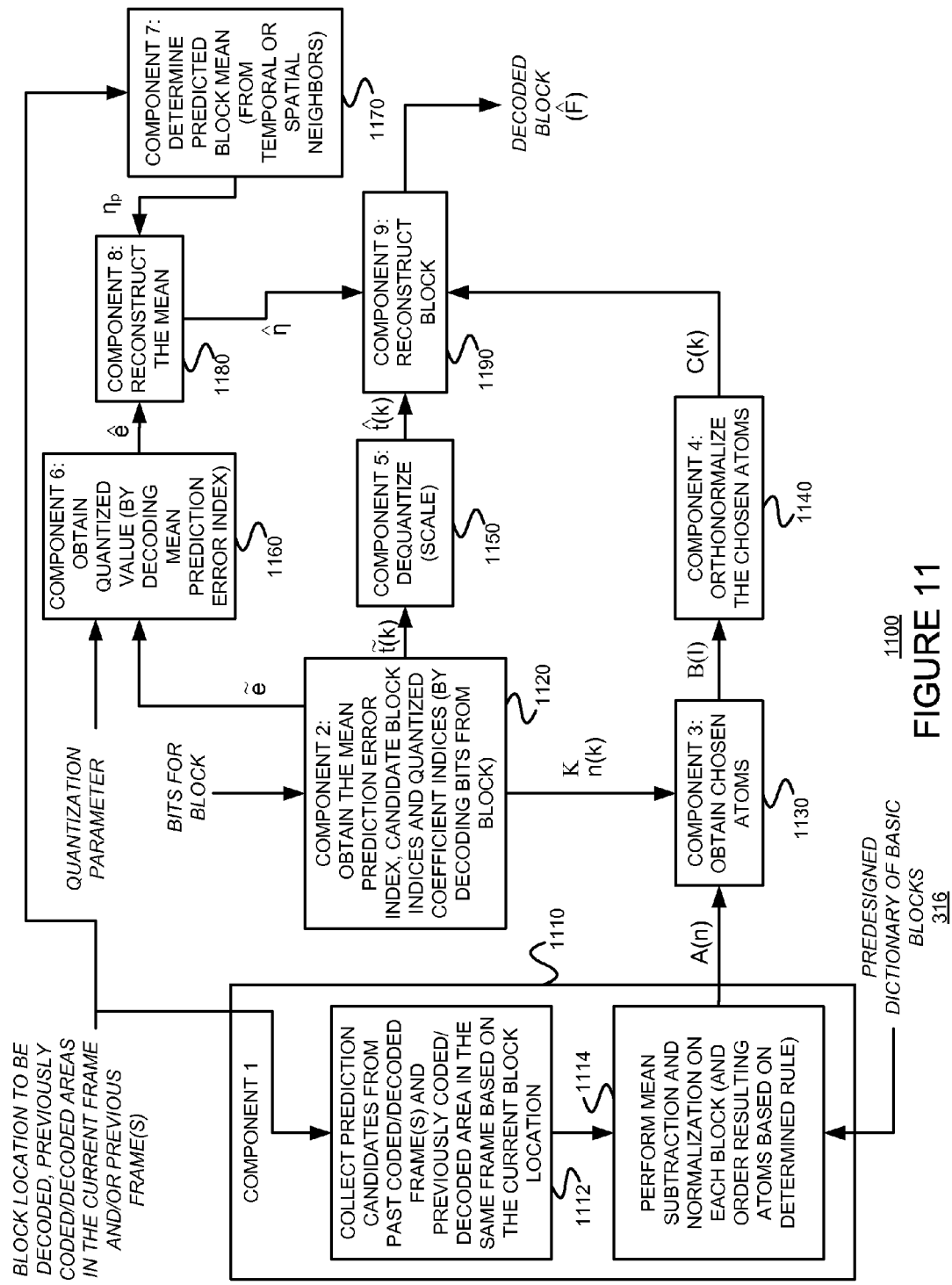
FIG. 11 is a block diagram of a video decoder consistent with the present invention.

FIG. 11 is a block diagram of an example decoder 1100 for decoding (or reconstructing) one block in a video frame using the bits describing this block. Assume the bits for this block have been extracted from the entire bitstream for a video sequence. Further assume that the decoder 400 saves the previously reconstructed frame as well as the previously reconstructed blocks of the current frame, and that the decoder 1100 knows the position of the block being decoded.

Component 1 1110 will construct the same set of dictionary atoms A(n), n=1, 2, . . . , N, as in Component 1 310 of the example encoder 300 based on the location information of the block being decoded.

Component 2 1120 will decode the bitstream for this block to derive K, ẽ, n(k), t̂(k), k=1, 2, . . . , K. Note that the operations by this component 1120 will depend on the operations of Component 7 370 in the example encoder 300.

Component 3 1130 extracts the chosen candidates B(k)=A(n(k)) based on the decoded indices n(k).

Component 4 1140 performs the Gram-Schmidt orthonormalization on the chosen candidates B(k), k=1, 2, . . . , K to generate orthonormal blocks C(k), k=1, 2, . . . , K. More specifically, starting with k=1, it 1140 recursively computes C(k) using $C(k)=B(k)-\Sigma_{i=1}^{k-1}(B(k),C(i))C(i)$, and C'(k)=C'(k)/∥C'(k)∥ As previously defined, (B,C) denotes the inner product of two vectors B and C, and $\|C\|=(C,C)^{1/2}$.

Component 5 1150 generates the quantized coefficient values (t̂(k)), based on the quantized coefficient indices (t̃(k)), using a dequantizer that corresponds to the quantizer in Component 4 340 of the encoder 300.

Component 6 1160 generates the quantized mean prediction error ê based on the quantization index (e), using a dequantizer that corresponds to the quantizer in Component 6 360 of the encoder 300.

Component 7 1170 determines the predicted block mean ($\eta_p$) using the same procedure as Component 5 350 in the encoder 300.

Component 8 1180 determines the quantized block mean ($\hat{\eta}$) using $\hat{\eta}=\eta_p+\hat{e}$.

Component 9 1190 reconstructs the block using $\hat{F}=\Sigma_{k=1}^{K}\hat{t}(k)C(k)+\hat{\eta}$ In an alternative decoder consistent with the present invention, the entire set of dictionary atoms A(n) does not need to be reconstructed. Rather only those atoms indicated by the decoded chosen atom indices n(k) are needed. In such an alternative decoder, components 1 1110 and 3 1130 would be replaced.

§5.3.2 Example Methods Used in Decoding

Figure 12:
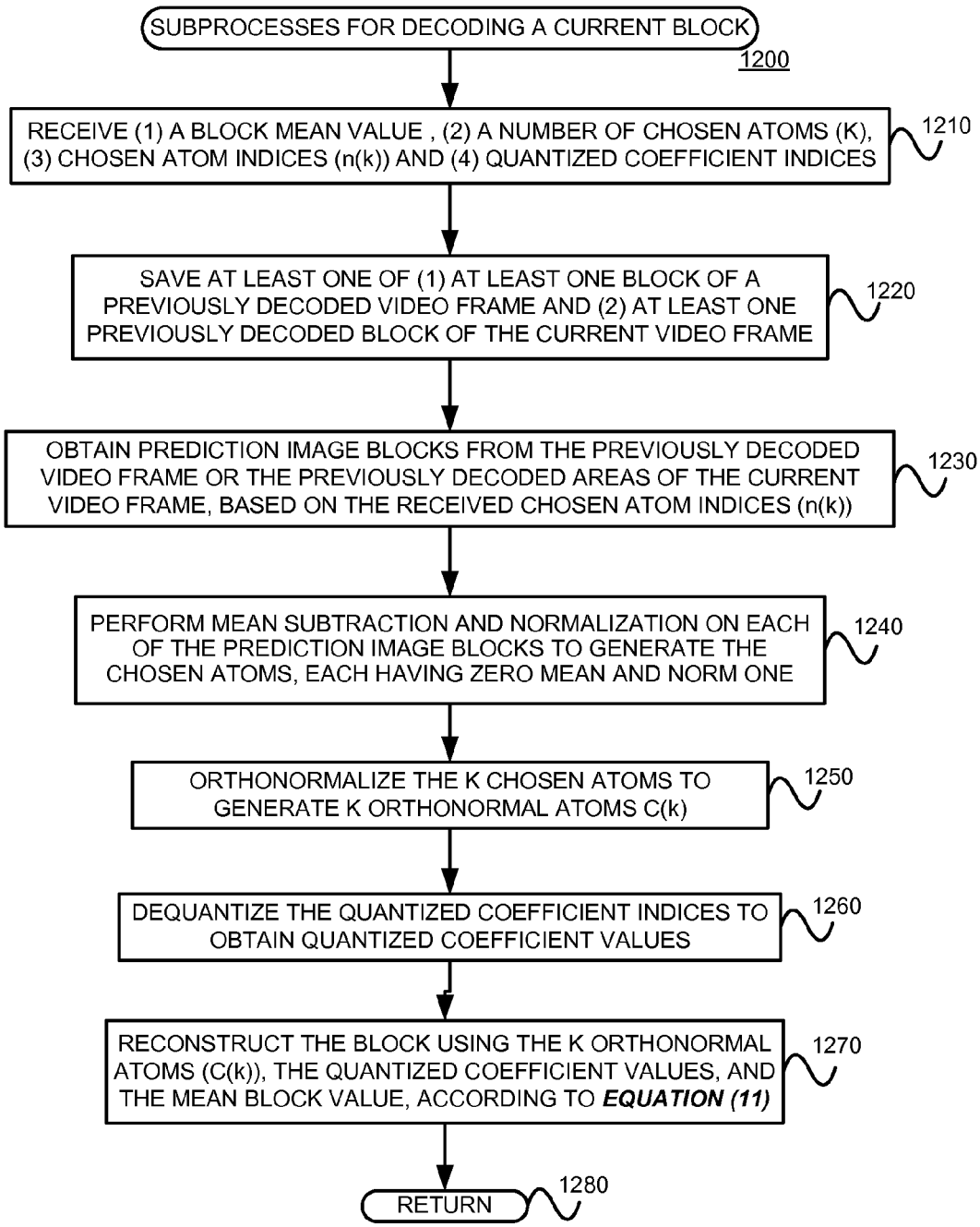
FIG. 12 is a flow diagram of an example method, consistent with the present invention, for performing sub-processes for decoding of a current block.

FIG. 12 is a flow diagram of an example method 1200 of sub-processes for decoding a block (F) of a current video frame. The following assumes that certain information received as input has been extracted from an encoded bit stream. The example method 1200 receives (1) a quantized block mean value ($\hat{\eta}$), (2) a number of chosen atoms (K), (3) chosen atom indices (n(k)) and (4) quantized coefficient indices (t̃(k)). (Block 1210) The example method 1200 saves at least one of (i) at least one block of a previously decoded video frame and (ii) at least one previously decoded block of the current video frame. (Block 1220) The example method 1200 obtains prediction image blocks from the previously decoded video frame or the previously decoded areas of the current video frame, based on the received chosen atom indices (n(k)). (Block 1230. Recall, e.g., 1170 of FIG. 11.) The example method 1200 also performs mean subtraction and normalization on each of the prediction image blocks to generate the chosen atoms, each having zero mean and norm one. (Block 1240. Recall, e.g., 1130 of FIG. 11.) The example method 1200 then orthonormalizes the K chosen atoms to generate K orthonormal atoms C(K). (Block 1250. Recall, e.g., 1140 of FIG. 11.) The example method 1200 then dequantizes (e.g., scales) the quantized coefficient indices (t̃(k)) to obtain quantized coefficient values (t̂(k)). (Block 1260. Recall, e.g., 1150 of FIG. 11.) Finally, the example method 1200 reconstructs the block using the K orthonormal atoms (C(k)), the quantized coefficient values (t̂(k)), and the mean block value, according to:

$$\hat{F}=\Sigma_{k=1}^{K}\hat{t}(k)C(k)+\hat{\eta} \qquad (11)$$

(Block 1270. Recall, e.g., 1190 of FIG. 11.) before the example method 1200 is left (Node 1280).

§5.4 EXAMPLE APPARATUS

Figure 13:
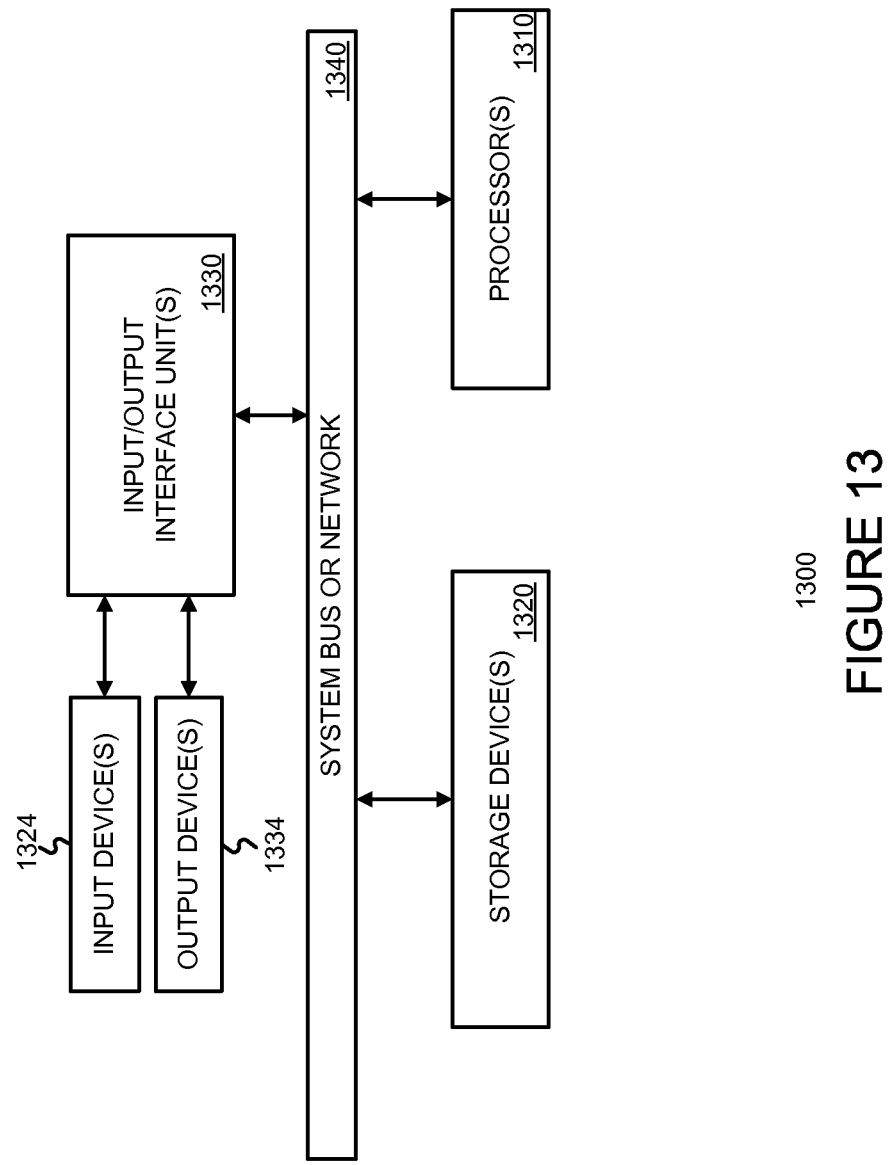
FIG. 13 is a block diagram of a machine, consistent with the present invention, which may be used to perform various processes and store various information and parameters used when encoding and/or decoding blocks of video frames.

FIG. 13 is high-level block diagram of an exemplary machine 1300 that may be used to perform one or more of the methods described in this application, and/or store information used and/or generated by such methods. For example, one or more machines 1300 may be provided as the various "units" or "components" used in the foregoing description. Alternatively, or in addition, the various "units" or "components" used in the foregoing description may be implemented with integrated circuits, such as application specific integrated circuits ("ASICs") and/or field programmable gate or logic arrays ("FPGAs"). The exemplary machine 1300 includes one or more processors 1310, one or more storage devices 1320, one or more input/output interface units 1330, and one or more system buses and/or networks 1340 for facilitating the communication of information among the coupled elements. One or more input devices 1332 (e.g., video cameras, microphones, touch screens, keyboards, etc.) and one or more output devices 1334 (e.g., video displays, speakers, etc.) may be coupled with the one or more input/output interfaces 1330. The one or more processors 1310 may execute machine-executable instructions to perform one or more aspects of the present invention. At least a portion of the machine executable instructions may be stored (temporarily or more permanently) on the one or more storage devices 1320 and/or may be received from an external source via one or more input interface units 1330.

In some embodiments consistent with the present invention, the processors 1310 may be one or more microprocessors. The bus 1340 may include a system bus. The storage devices 1320 may include system memory, such as read only memory (ROM) and/or random access memory (RAM). The storage devices 1320 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

§5.5 REFINEMENTS, ALTERNATIVES AND EXTENSIONS

Although the proposed coding framework can use a dictionary that contains both inter- and intra-prediction candidates, and a fixed part containing DCT basis vectors, preliminary simulation results have shown that intra-prediction candidates and DCT basis vectors are rarely chosen.

The example methods 700-1000 in FIGS. 7-10, respectively, the convergence criteria used to end the process (Recall, e.g., conditions 730, 840, 870, 940, 970, 1040 and 1070) may be different from those described.

Referring back to component 7 370 of FIGS. 3 and 450 of FIG. 4, the chosen atom indices (n(k)) may be coded as follows. In a first example way, n(k), k=1, 2, . . . , K, are coded directly or using a predictive coding method. A second example way may be used when the dictionary contains only the self-adaptive part, and the candidate atoms are from the prediction blocks extracted from a previous frame over a search range that is a rectangular region surrounding the current block. First, create a 2D matrix, with each element corresponding to one prediction block location, so that the top-left element corresponds to the top-left prediction block in the search range, and the right-bottom element corresponds to the bottom-right prediction block in the search range. Then, assign value "k" to an element that corresponds to the $k^{th}$ chosen atom "n(k)", and assign "0" to all remaining elements corresponding to non-chosen atoms. Finally, code this index matrix using an entropy coding method. In this second way, the index matrix can be further decomposed into two parts—(1) a binary matrix which assigns "1" to all elements with non-zero entries in the original matrix, and assigns "0" to all elements with zero entries, and (2) a sequence that consists of "k" values in those elements with non-zero entries, following a predefined scan order of the 2D matrix (e.g., a spiral path). The binary matrix and the sequence of "k" values can be coded using different entropy coding methods based on their own statistics.

The foregoing methods may be implemented with the following parameters:
  a. block size of 16×16 with M=256; and
  b. inter-candidate search range of +/−24 with integer shifts only.

This leads to 2304 candidates for non-boundary blocks.

The present inventor has found through the experiments that the modified OMP algorithm tends to give non-sparse solution when the frame is noisy, and for some blocks the modified OMP algorithm tends to converge slowly. In both cases, the later chosen atoms generally do not help to improve the perceived quality. By implementing an early termination mechanism (Recall the methods of FIGS. 8 and 10.) that ends the iteration whenever either the number of chosen atoms exceeds a maximum allowable value (e.g., 40), or the sparse representation error reduction ratio drops below a threshold (e.g., 0.04) (Recall, e.g., 840 of FIGS. 8 and 1040 of FIG. 10.), simulated performance of an encoder consistent with the present invention was improved.

It is expected that with variable block sizes and a more efficient entropy coding method, the proposed encoder could be improved further.

At present, an example encoder consistent with the present invention has reduced coding efficiency as more frames are coded. The present inventor suspects that the error propagation and the lack of an efficient deblocking filter are the causes of this problem. The error propagation problem may be mitigated by introducing additional fixed atoms to the dictionary. Alternatively, the encoder can use a dictionary containing only the self-adaptive part, and uses a separate fixed dictionary to code the residual after using the first dictionary. This second dictionary can be a conventional orthonormal transform such as DCT, or a redundant learnt dictionary.

Although the foregoing does not consider intra-frame coding, one can apply a similar idea which uses all intra-prediction candidates in the adaptive part of the dictionary, which can consist of shifted blocks in the previously coded areas in the same frame as well as the intra-prediction candidates using the various intra-prediction modes in H.264 and HEVC.

Under the proposed general framework, many components can be further optimized. The current coder uses a fixed block size. However, it is relatively straight forward to apply it with variable block sizes, and choose the block size using a rate-distortion optimization approach.

A major challenge in applying sparse representation for compression is that the dictionary atoms are generally not orthogonal. Quantizing the coefficients associated with them directly and independently is not efficient. First of all, the quantization errors of the coefficients are related to the errors in the reconstructed samples in a complicated way. Secondly, these coefficients are likely to have high correlation. As understood by the present inventor, no existing dictionary-based video coders, except as discussed in the article, Je-Won Kang, Moncef Gabbouj, and C.-C. Jay Kuo, "Sparse/dct (s/dct) Two-Layered Representation Of Prediction Residuals for Video Coding," *IEEE Trans. on Image*

*Processing*, vol. 22, no. 7, pp. 2711-2722, (July 2013), have produced compression performance that is better than the H.264 and HEVC standards. The dictionary-based video coder discussed in the foregoing article yielded only slightly better performance than HEVC. The present inventor believes that one reason that these coders have not been more successful is because they quantize the sparse coefficients associated with the chosen atoms directly.

§5.6 CONCLUSIONS

Simulations performed by, or under the direction of, the inventor have demonstrated that using the proposed self-adaptive dictionary can lead to a very sparse representation, with significantly fewer non-zero coefficients, than using the DCT on the error between the original block and the best prediction candidate.

The significant improvement of the proposed coder compared to H.264, even when many components are not optimized, is very encouraging, and evidences the promise of using the self-adaptive dictionary for video block representation. When using a redundant dictionary, designing an efficient quantization and coding method to describe the resulting sparse representation is important. Therefore, in addition to the use of self-adaptive dictionary, the proposed embedded orthonormalization process also contributes greatly to the efficiency of the proposed coder.

Note that the modified OMP algorithm with embedded orthonormalization would have got the same results as the original OMP followed by orthonormalization. By embedding orthonormalization inside OMP, it is computationally more efficient. This algorithm is not limited to the encoding application described here. It is applicable for any sparse recovery problem solving the optimization problem described above with reference to Equations (4) and (5). If other more efficient algorithms are used for solving the sparse representation problem using either L0 or L1 norm, and it is not easy to embed orthonormalization inside, one can always apply orthonormalization afterwards.

The revised OMP algorithm with embedded orthonormalization yielded noticeably improved results over the modified OMP algorithm with embedded orthonormalization. Specifically, it can represent a block with the same accuracy using a smaller number of non-zeros coefficients. This algorithm is not limited to the encoding application described here. It is applicable for any sparse recovery problem solving the optimization problem described above with reference to Equations (4) and (5).

What is claimed is:

1. A video coding method for coding a block (F) of a current video frame, the method comprising:
   a) receiving as input at least one of (i) at least one block of a previously coded video frame and (ii) at least one previously coded block of the current video frame;
   b) generating a redundant dictionary for representing the current block, wherein the redundant dictionary includes a self-adaptive part including candidate atoms determined by performing mean subtraction and normalization on each of the received at least one of (i) at least one block of a previously coded video frame and (ii) at least one previously coded block of the current video frame to generate the candidate atoms of the self-adaptive part, each having zero mean and norm one;
   c) coding a mean value (η) of the current block (F) either directly, or using predictive coding method;
   d) generating a mean-subtracted block using the current block and the mean value of the current block (F'=F−η);
   e) determining
      1) a number (K) of orthonormalized atoms,
      2) a subset of K candidate atoms of the redundant dictionary specified by indices n(k), k=1, 2, . . . , K,
      3) the K orthonormal atoms (C(k)) determined from the subset of atoms (A(n(k))), and
      4) quantized coefficients (t̂(k)), quantized coefficient indices (t̃(k)) associated with the K orthonormal atoms (C(k))
      such that a measure of sparsity of non-zero coefficients (t(k)) of the K orthonormal atoms is minimized and the mean-subtracted block F' can be approximated well by a linear combination of C(k) with the quantized coefficients (t̂(k)); and
   f) applying entropy coding on the indices of the subset of atoms (n(k)), and the quantized coefficient indices (t̃(k)).

2. The method of claim 1 wherein the act of determining (1) a number (K) of orthonormal atoms, (2) a subset of K candidate atoms of the redundant dictionary specified by the indices n(k), k=1, 2, . . . , K, (3) the K orthonormalized atoms (C(k)) determined from the subset of atoms (A(n(k))), and (4) quantized coefficients (t̂(k)), quantized coefficient indices (t̃(k)) associated with the K orthonormal atoms (C(k)) such that a measure of sparsity of non-zero coefficients (t(k)) of the K orthonormal atoms is minimized and the mean-subtracted block F' can be approximated well by a linear combination of C(k) with the quantized coefficients (t̂(k)), includes
   determining a number L and a first subset of L candidate atoms (B(l)) of the redundant dictionary, indexed by m(l), so that B(l)=A(m(l)), wherein the subset of the candidate atoms can be linearly combined with coefficients w(l) to represent the mean-subtracted block F' with an error less than a predetermined value, while minimizing a cost function which is a measure of sparsity of the coefficients, and
   determining
      (1) the number K and the K orthonormal atoms (C(k)) that can represent the subspace defined by the first subset of atoms (B(l)), and the indices n(k) that specify the candidate atoms in the redundant dictionary that are used to derived the orthonormal atoms (C(k)), and
      (2) quantized coefficients (t̂(k)) associated with the K orthonormal vectors (C(k)).

3. The method of claim 2 wherein the cost function is an L1 norm of w(n) and finds coefficients w(n), where n=1, 2, . . . , N, by solving the following optimization problem:

$$\text{Find } w(n) \text{ to minimize } \sum_n |w(n)|$$

$$\text{subject to: } \frac{1}{M} \left\| F' - \sum_n w(n)A(n) \right\|^2 \leq \epsilon_1^2.$$

4. The method of claim 2 wherein the cost function is an L0 norm of w(n) and finds coefficients w(n), where n=1, 2, . . . , N, by solving the following optimization problem:

$$\text{Find } w(n) \text{ to minimize } \sum_n |w(n)|_0$$

$$\text{subject to: } \frac{1}{M}\left\|F' - \sum_n w(n)A(n)\right\|^2 \le \epsilon_1^2. \qquad 5$$

5. The method of claim 2 wherein the act of determining (1) the number K and the K orthonormal atoms (C(k)) that can represent the subspace defined by the first subset of atoms (B(l)), and the indices n(k) that specify the candidate atoms in the redundant dictionary that are used to derived the orthonormal atoms (C(k)), and (2) quantized coefficients ($\tilde{t}$(k)) associated with the K orthonormal vectors (C(k)), includes
performing recursive orthonormalization on the first subset of candidate atoms B(l) and quantization on coefficients of the orthonormal atoms C(k), and
deriving the K orthonormal atoms (C(k)) from the first subset of atoms (B(l)) using a Gram-Schmidt orthonormalization procedure on the first subset of atoms (B(l)).

6. The method of claim 2 wherein the act of determining (1) K orthonormal vectors (C(k)) that can approximate the subspace defined by the first subset of atoms (B(l)), and (2) the quantized coefficients ($\tilde{t}$(k)) associated with the K orthonomal vectors (C(k)) includes:
1) receiving
a quantization parameter,
the mean subtracted block (F') of the current block,
a number of atoms (L) to be included in the first subset,
each of the atoms of the first subset (B(l)), and
indices of the atoms of the first subset (m(l));
2) initializing
a first of the K orthonormal vectors (C(1)) to the first of the first subset of candidate atoms (B(1)),
a first coefficient (t(1)) to an inner product of the mean subtracted block (F') and the first of the K orthonormal vectors (C(1));
the number K to zero; and
the indices k and l to one;
3) quantizing the $k^{th}$ coefficient (t(k)) using the quantization parameter to obtain the $k^{th}$ quantized coefficient $\hat{t}$(k);
4) determining whether or not the $k^{th}$ quantized coefficient $\hat{t}$(k) is zero;
5) responsive to a determination that the $k^{th}$ quantized coefficient $\hat{t}$(k) is not zero,
setting the index of the $k^{th}$ of a second subset of candidate atoms (n(k)) to the index of the atom (m(l)) of the first subset,
setting the number K to k, and
incrementing k;
6) determining whether or not the index of the atom (l) of the first subset is greater than or equal to the total number of atoms (L) in the first subset; and
7) responsive to a determination that the index of the atom (l) of the first subset is greater than or equal to the total number of atoms (L) in the first subset, outputting
the number of orthonormal vectors (K),
each of the indices of the subset of candidate atoms (n(k)),
each of the K orthonormal atoms C(k),
each of the K quantized coefficients ($\hat{t}$(k)), and
each of the K quantized coefficient indices ($\tilde{t}$(k)), and otherwise, responsive to a determination that the index of the atom (l) of the first subset is not greater than or equal to the total number of atoms (L) in the first subset, incrementing the index of the atom (l) of the first subset, and
determining an intermediate vector C'(k) as:

$C'(k)=B(l)-\sum_{i=1}^{k-1}(B(l)C(i))C(i)$, where $(B(l),C(i))$ denotes an inner product of two vectors $B(l)$ and $C(i)$, determining the $k^{th}$ orthonormal vector C(k) as:

$C(k)=C'(k)/\|C'(k)\|$, where $\|C'(k)\|$ denotes an $L2$ norm of $C'(k)$, determining a $k^{th}$ coefficient (t(k)) as an inner product of the mean subtracted block (F') and the determined $k^{th}$ orthonormal vector C(k), and
repeating acts (3)-(7).

7. The method of claim 6 wherein, before the act of initializing, the atoms (m(l)) of the subset are ordered based on the magnitudes of coefficients w(m(l)) associated with their corresponding atoms, wherein the coefficient with the largest magnitude is the first chosen atom.

8. The method of claim 2 wherein the first subset of candidate atoms includes only those candidate atoms with coefficients larger than a threshold ($\epsilon_2$) in magnitude.

9. The method of claim 1 wherein the act of determining (1) a number (K) of orthonormal atoms, (2) a subset of K candidate atoms of the redundant dictionary specified by the indices n(k), k=1, 2, . . . , K, (3) the K orthonormal atoms (C(k)) determined from the subset of atoms (A(n(k))), and (4) quantized coefficient indices ($\tilde{t}$(k)) associated with the K orthonomal atoms (C(k)), such that a measure of sparsity of non-zero coefficients (t(k)) of the K orthonormalized atoms is minimized, uses an orthogonal matching pursuit ("OMP") process with embedded orthonormalization.

10. The method of claim 1, wherein the act of determining (1) a number (K) of orthonormal atoms, (2) a subset of K candidate atoms of the redundant dictionary specified by the indices n(k), k=1, 2, . . . , K, (3) the K orthonormal atoms (C(k)) determined from the subset of atoms (A(n(k))), and (4) quantized coefficients ($\hat{t}$(k)), quantized coefficient indices ($\tilde{t}$(k)) associated with the K orthonormal atoms (C(k)) such that a measure of sparsity of non-zero coefficients (t(k)) of the K orthonormal atoms is minimized and the mean-subtracted block F' can be approximated well by a linear combination of C(k) with the quantized coefficients ($\hat{t}$(k)), includes
(1) initializing a residual vector (r) to the mean subtracted current block, and initializing k to zero,
(2) determining whether $\|r\|_2$ is greater than a predetermined threshold ($\epsilon_1$),
(3) responsive to a determination that $\|r\|_2$ is greater than the predetermined threshold ($\epsilon_1$),
A) incrementing k;
B) choosing an atom, not previously chosen, from the redundant dictionary that is most closely correlated with the residual value (r), and setting n(k) to the index of the chosen atom,
C) orthonormalizing the chosen atom with respect to any and all previously chosen and orthonormal atoms in a set of orthonormal atoms to define a new orthonormal atom (C(k)),
D) adding the new orthonormal atom (C(k)) to the set orthonormal atoms,
E) setting a coefficient t(k) to an inner product of the mean subtracted current block and the orthonormal atom (C(k)), F) adding the coefficient t(k) to a set of coefficients,
G) updating the residual vector (r) so that a new residual vector (r') is the previous residual vector (r) less t(k)C(k), set r to r', and
H) repeating (2) and (3), otherwise, responsive to a determination that $\|r\|_2$ is not greater than the predetermined threshold ($\epsilon_1$),
A) setting the number of chosen atoms (K) to k, and
B) outputting the number of chosen atoms (K), the chosen atom index set n(k), the set of orthonormal atoms C(K), and the set of coefficients (t(k)).

11. The method of claim 1 wherein the act of determining (1) a number (K) of orthonormal atoms, (2) a subset of K candidate atoms of the redundant dictionary specified by the indices n(k), k=1, 2, . . . , K, (3) the K orthonormal atoms (C(k)) determined from the subset of atoms (A(n(k))), and (4) quantized coefficients ($\hat{t}(k)$), quantized coefficient indices ($\hat{t}(k)$) associated with the K orthonormal atoms (C(k)) such that a measure of sparsity of non-zero coefficients (t(k)) of the K orthonormal atoms is minimized and the mean-subtracted block F' can be approximated well by a linear combination of C(k) with the quantized coefficients ($\hat{t}(k)$), includes
(1) initializing a residual vector (r) to the mean subtracted current block, and initializing k to zero.
(2) responsive to a determination that k>0,
A) determining $\|r\|_2$
B) responsive to a determination that $\|r\|_2$ is greater than a predetermined threshold ($\epsilon_1$) and the error reduction ratio defined as $(\|r''\|_2-\|r\|_2)/\|r''\|_2$ is greater than a predetermined threshold ($\epsilon_2$),
i) incrementing k,
ii) choosing an atom, not previously chosen, from the redundant dictionary that is most closely correlated with the residual vector (r), and setting n(k) to the index of the chosen atom,
iii) orthonormalizing the chosen atom with respect to any and all previously chosen and orthonormal atoms in a set of orthonormal atoms to define a new orthonormal atom (C(k)),
iv) adding the new orthonormal atom (C(k)) to the set of orthonormal atoms,
v) setting a coefficient t(k) to an inner product of the mean subtracted current block and the orthonormal atom (C(k)),
vi) updating the residual vector (r) so that a new residual vector (r') is the previous residual vector (r) less t(k)C(k), setting r'' to r, and setting r to r',
vii) adding the coefficient t(k) to a set of coefficients, and
viii) repeating step (2),
otherwise, responsive to a determination that $\|r\|_2$ is not greater than the predetermined threshold ($\epsilon_1$), or the error reduction ratio defined as $(\|r''\|_2-\|r\|_2)/\|r''\|_2$ is greater not than a predetermined threshold ($\epsilon_2$),
i) setting the number of chosen atoms (K) to k, and
ii) outputting the number of chosen atoms (K), the set of chosen atom indices n(k), the set of orthonormal atoms (C(k)) and the set of coefficients (t(k)),
otherwise, responsive to a determination that k=0,
A) determining $\|r\|_2$, and
B) responsive to a determination that $\|r\|_2$ is greater than a predetermined threshold ($\epsilon_1$),
i) incrementing k,
ii) choose an atom, not previously chosen, from the redundant dictionary that is most closely correlated with the residual vector (r), and setting n(k) to the index of the chosen atom,
iii) orthonormalize the chosen atom with respect to any and all previously chosen and orthonormal atoms in a set of orthonormal atoms to define a new orthonormal atom (C(k)),
iv) add the new orthonormal atom (C(k)) to the set orthonormal atoms,
v) set a coefficient t(k) to an inner product of the mean subtracted current block and the orthonormal atom (C(k)),
vi) update the residual vector (r) so that a new residual vector (r') is the previous residual vector (r) less t(k)C(k), set r'' to r, and set r to r.'
vii) add the coefficient t(l) to a set of coefficients, and
viii) repeating step (2),
otherwise, responsive to a determination that $\|r\|_2$ is not greater than a predetermined threshold ($\epsilon_1$),
i) setting the number of chosen atoms (K) to k, and
ii) outputting the number of chosen atoms (K), the index set of the chosen atoms n(k), the set of orthonormal atoms (C(k)) and the set of coefficients (t(k)).

12. The method of claim 1 wherein the act of determining (1) a number (K) of orthonormal atoms, (2) a subset of K candidate atoms of the redundant dictionary specified by the indices n(k), k=1, 2, . . . , K, (3) the K orthonormal atoms (C(k)) determined from the subset of atoms (A(n(k))), and (4) quantized coefficients ($\hat{t}(k)$), quantized coefficient indices ($\hat{t}(k)$) associated with the K orthonormal atoms (C(k)) such that a measure of sparsity of non-zero coefficients (t(k)) of the K orthonormal atoms is minimized and the mean-subtracted block F' can be approximated well by a linear combination of C(k) with the quantized coefficients ($\hat{t}(k)$), includes
(1) initializing a residual vector (r) to the mean subtracted current block, and initialize k to zero,
(2) responsive to a determination that k>0,
A) determining $\|r\|_2$,
B) responsive to a determination that $\|r\|_2$ is greater than a predetermined threshold ($\epsilon_1$),
i) orthonormalize all remaining atoms in the updated redundant dictionary (A(n)) with respect to the last chosen normalized atom C(k), by performing $$A(n)=A(n)-(A(n),C(k))C(k)$$

$$A(n)=A(n)/\|A(n)\|_2,$$

thereby updating all remaining atoms in the dictionary with the above updated atoms,
ii) incrementing k,
iii) choosing an atom, not previously chosen, from the redundant dictionary that is most closely correlated with the residual vector (r),
iv) recording the index of the chosen atom as n(k), recording the chosen atom as C(k), and recording the correlation coefficient t(k),
v) adding the chosen atom C(k) to the set of chosen orthonormal atoms,
vi) adding the coefficient t(k) to a set of coefficients,
vii) updating the residual vector (r) so that a new residual vector (r') is the previous residual vector (r) less t(k)C(k), setting r'' to r, and setting r to r', and
viii) repeating step (2), otherwise, responsive to a determination that $\|r\|_2$ is not greater than a predetermined threshold ($\epsilon_1$),
  i) setting the number of chosen atoms (K) to k, and
  ii) outputting the number of chosen atoms (K), the set of indices of the chosen atoms n(k), the set of orthonormal atoms (C(k)) and the set of coefficients (t(k)),
otherwise, responsive to a determination that k=0,
  A) determine $\|r\|_2$,
  B) responsive to a determination that $\|r\|_2$ is greater than a predetermined threshold ($\epsilon_1$),
    i) incrementing k,
    ii) choosing an atom, not previously chosen, from the redundant dictionary that is most closely correlated with the residual vector (r),
    iii) recording the index of the chosen atom as n(k), recording the chosen atom as C(k), and recording the correlation coefficient t(k),
    iv) adding the chosen atom C(k) to the set chosen orthonormal atoms,
    v) adding the coefficient t(k) to a set of coefficients, and
    vi) updating the residual vector (r) so that a new residual vector (r') is the previous residual vector (r) less t(k)C(k), and setting r to r', and
    vii) repeating step (2),
  otherwise, responsive to a determination that $\|r\|_2$ is not greater than a predetermined threshold ($\epsilon_1$),
    i) setting the number of chosen atoms (K) to k, and
    ii) outputting the number of chosen atoms (K), the set of orthonormal atoms (C(k)) and the set of coefficients (t(k)).

13. The method of claim 1 wherein the act of determining (1) a number (K) of orthonormal atoms, (2) a subset of K candidate atoms of the redundant dictionary specified by the indices n(k), k=1, 2, . . . , K, (3) the K orthonormal atoms (C(k)) determined from the subset of atoms (A(n(k))), and (4) quantized coefficients ($\hat{t}(k)$), quantized coefficient indices ($\hat{t}(k)$) associated with the K orthonormal atoms (C(k)) such that a measure of sparsity of non-zero coefficients (t(k)) of the K orthonormal atoms is minimized and the mean-subtracted block F' can be approximated well by a linear combination of C(k) with the quantized coefficients ($\hat{t}(k)$), includes
  (1) initializing a residual vector (r) to the mean subtracted current block, and initializing k to zero.
  (2) responsive to a determination that k>0,
    A) determining whether an error reduction ratio defined as $(\|r'\|_2 - \|r\|_2)/\|r''\|_2$ is greater than a predetermined threshold ($\epsilon_2$), and
    B) responsive to a determination that both $\|r\|_2$ is greater than the predetermined threshold ($\epsilon_1$) and the error reduction ratio is greater than the predetermined threshold ($\epsilon_2$),
      i) orthonormalizing all remaining atoms in the updated redundant dictionary (A(n)) with respect to the last chosen normalized atom C(k), by performing $$A(n)=A(n)-(A(n),C(k))C(k)$$

$$A(n)=A(n)/\|A(n)\|_2,$$

thereby updating all remaining atoms in the dictionary with the updated atoms,
      ii) incrementing k, iii) choosing an atom, not previously chosen, from the redundant dictionary that is most closely correlated with the residual vector (r),
      iv) recording the index of the chosen atom as n(k), the chosen atom as C(k), and the correlation coefficient t(k),
      v) adding the chosen atom C(k) to the set chosen orthonormal atoms,
      vi) adding the coefficient t(k) to a set of coefficients, and
      vii) updating the residual vector (r) so that a new residual vector (r') is the previous residual vector (r) less t(k)C(k), set r'' to r, and r to r.'
      viii) repeating step (2)
    otherwise, responsive to a determination that either $\|r\|_2$ is not greater than the predetermined threshold ($\epsilon_1$) or the error reduction ratio is greater than the predetermined threshold ($\epsilon_2$),
      i) setting the number of chosen atoms (K) to k, and
      ii) outputting the number of chosen atoms (K), the set of orthonormal atoms (C(k)), the indices (n(k)), and the set of coefficients (t(k)),
  otherwise, responsive to a determination that k=0
    A) determine whether $\|r\|_2$ is greater than a predetermined threshold ($\epsilon_1$),
    B) responsive to a determination that $\|r\|_2$ is greater than a predetermined threshold ($\epsilon_1$),
      i) incrementing k,
      ii) choosing an atom, not previously chosen, from the redundant dictionary that is most closely correlated with the residual vector (r),
      iii) recording the index of the chosen atom as n(k), the chosen atom as C(k), and the correlation coefficient t(k),
      iv) adding the chosen atom C(k) to the set chosen orthonormal atoms,
      v) adding the coefficient t(l) to a set of coefficients, and
      vi) updating the residual vector (r) so that a new residual vector (r') is the previous residual vector (r) less t(k)C(k), set r'' to r, and r to r.'
      vii) repeating step (2)
    otherwise, responsive to a determination that that $\|r\|_2$ is not greater than a predetermined threshold ($\epsilon_1$)
      i) setting the number of chosen atoms (K) to k, and
      ii) outputting the number of chosen atoms (K), the set of orthonormal atoms (C(k)) and the set of coefficients (t(k)).

14. The method of claim 1 wherein the self-adaptive part of the redundant dictionary includes at least one of (A) all inter-prediction candidates corresponding to different integer motion vectors, and (B) all the intra-prediction candidates corresponding to different intra-prediction modes of an H.264 compliant encoder, or an HEVC compliant encoder.

15. The method of claim 1 wherein the redundant dictionary further includes a predesigned part including candidate atoms that can be linearly combined to represent a residual prediction error after using the candidate atoms of the self-adaptive part.

16. The method of claim 15 wherein the candidate atoms of the predesigned part of the redundant dictionary are atoms of a learned dictionary, trained by the prediction error blocks when only the candidate atoms in the self-adaptive part of the dictionary is used to predict the original block.

17. The method of claim 15 wherein the candidate atoms of the predesigned part of the redundant dictionary are from a fixed orthonormal basis, except the one that is all constant.

18. The method of claim 1 wherein the received at least one of (i) at least one block of a previously coded video frame is at least one block that was extracted from a previously coded frame in a defined search range surrounding the current block and (ii) at least one previously coded block of the current video frame is at least one block that was extracted from a defined search range in a previously coded area of the current frame.

19. A video decoding method for decoding a block (F) of a current video frame, the method comprising:
   a) decoding the bits for this block to yield (1) a quantized block mean value $\hat{\eta}$, (2) a number of chosen atoms (K), (3) chosen atom indices (n(k)) and (4) quantized coefficient indices ($\tilde{t}(k)$);
   b) saving at least one of (i) at least one block of a previously decoded video frame and (ii) at least one previously decoded block of the current video frame;
   c) obtaining prediction image blocks from the previously decoded video frame or the previously decoded areas of the current video frame, based on the received chosen atom indices (n(k));
   d) performing mean subtraction and normalization on each of the prediction image blocks to generate the chosen atoms, each having zero mean and norm one;
   e) orthonormalizing the K chosen atoms to generate K orthonormal atoms C(K);
   f) dequantizing the quantized coefficient indices ($\tilde{t}(k)$) to obtain quantized coefficient values ($\hat{t}(k)$); and
   g) reconstructing the block using the K orthonormal atoms (C(k)), the quantized coefficient values ($\hat{t}(k)$), and the mean block value, according to
   $\hat{F} = \Sigma_{k=1}^{K} \hat{t}(k) C(k) + \hat{\eta}$.

20. A coding method for coding a block of sample values, the method comprising:
   a) receiving as input, a redundant dictionary including candidate atoms;
   b) responsive to a determination that the candidate atoms do not have zero mean and norm 1, performing mean subtraction and normalization on each of the candidate atoms before continuing processing, and otherwise, responsive to a determination that the candidate atoms have zero mean and norm 1, continuing processing;
   c) coding a mean value ($\eta$) of the block either directly, or using predictive coding method;
   d) generating a mean-subtracted block using the current block and the mean value of the current block (F'=F−$\eta$);
   e) determining
      (1) a number (K) of orthonormalized atoms,
      (2) a subset of K candidate atoms of the redundant dictionary specified by indices n(k), k=1, 2, ..., K,
      (3) the K orthonormal atoms (C(k)) determined from the subset of atoms (A(n(k))), and
      4) quantized coefficients ($\hat{t}(k)$), quantized coefficient indices ($\tilde{t}(k)$) associated with the K orthonormal atoms (C(k))
   such that a measure of sparsity of non-zero coefficients (t(k)) of the K orthonormal atoms is minimized and the mean-subtracted block F' can be approximated well by a linear combination of C(k) with the quantized coefficients ($\hat{t}(k)$); and
   f) applying entropy coding on the indices of the subset of atoms (n(k)), and the quantized coefficient indices ($\tilde{t}(k)$).

21. An encoder for coding a block of sample values, the encoder comprising:
   a) an input interface for receiving a redundant dictionary including candidate atoms;
   b) at least one processor configured to perform a method including
      1) responsive to a determination that the candidate atoms do not have zero mean and norm 1, performing mean subtraction and normalization on each of the candidate atoms before continuing processing, and otherwise, responsive to a determination that the candidate atoms have zero mean and norm 1, continuing processing,
      2) coding a mean value ($\eta$) of the block either directly, or using predictive coding method,
      3) generating a mean-subtracted block using the current block and the mean value of the current block (F'=F−$\eta$),
      4) quantized coefficients ($\hat{t}(k)$), quantized coefficient indices ($\tilde{t}(k)$) associated with the K orthonormal atoms (C(k))
   such that a measure of sparsity of non-zero coefficients (t(k)) of the K orthonormal atoms is minimized and the mean-subtracted block F' can be approximated well by a linear combination of C(k) with the quantized coefficients ($\hat{t}(k)$), and
      5) applying entropy coding on the indices of the subset of atoms (n(k)), and the quantized coefficient indices ($\tilde{t}(k)$).

* * * * *